US006289314B1

(12) United States Patent
Matsuzaki et al.

(10) Patent No.: US 6,289,314 B1
(45) Date of Patent: Sep. 11, 2001

(54) PAY INFORMATION PROVIDING SYSTEM FOR DESCRAMBLING INFORMATION FROM PLURAL SOURCES AND RESCRAMBLING THE INFORMATION BEFORE SENDING TO A TERMINAL OR TERMINALS

(75) Inventors: Natsume Matsuzaki, Minoo; Makoto Tatebayashi, Takarazuka; Motoji Ohmori, Osaka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 08/929,652

(22) Filed: Sep. 16, 1997

(30) Foreign Application Priority Data

Sep. 18, 1996 (JP) ................................... 8-246636

(51) Int. Cl.⁷ ..................................... G06F 17/60
(52) U.S. Cl. ................ 705/1; 348/1; 348/3; 348/5.5; 348/7; 348/10; 455/1; 455/2; 705/50; 705/51; 705/52; 705/400
(58) Field of Search ................. 705/1, 400, 41, 705/34, 27, 26, 51, 52, 50, 53, 57; 348/3, 7, 8, 10, 5.5; 379/93.01, 93.02; 455/1, 2, 3.1, 3.2

(56) References Cited

U.S. PATENT DOCUMENTS

| | | | |
|---|---|---|---|
| 4,484,027 | * 11/1984 | Lee et al. . | |
| 4,613,901 | 9/1986 | Gilhousen et al. | 358/122 |
| 4,700,387 | * 10/1987 | Hirata | 380/239 |
| 4,712,238 | 12/1987 | Gilhousen et al. . | |
| 4,723,283 | * 2/1988 | Nagasawa et al. | 380/240 |
| 4,751,732 | * 6/1988 | Kamitake | 380/230 |
| 5,325,431 | * 6/1994 | Naruse | 380/228 |
| 5,339,239 | * 8/1994 | Manabe et al. . | |
| 5,367,330 | * 11/1994 | Haave et al. . | |
| 5,619,247 | * 4/1997 | Russo . | |
| 5,701,152 | * 12/1997 | Chen . | |
| 5,724,521 | * 3/1998 | Dedrick . | |
| 5,752,238 | * 5/1998 | Dedrick . | |
| 5,754,787 | * 5/1998 | Dedrick . | |
| 5,796,829 | * 8/1998 | Newby et al. . | |
| 5,872,588 | * 2/1999 | Aras et al. . | |

FOREIGN PATENT DOCUMENTS

| | | |
|---|---|---|
| 0595354A1 | 5/1994 | (EP) . |
| 0831653 | * 3/1998 | (EP) . |
| 0975166 | * 1/2000 | (EP) . |
| 2132857 | * 7/1984 | (GB) . |
| 94/01825 | 1/1994 | (WO) . |
| 94/14280 | 6/1994 | (WO) . |

OTHER PUBLICATIONS

EBU Project Group B/CA: "Functional model of a conditional access system", EBU Review Technical, BE, European Broadcasting Union, Brussels, No. 266, Dec. 1995, pp. 64–77.

* cited by examiner

Primary Examiner—Edward R. Cosimano
(74) Attorney, Agent, or Firm—Wenderoth, Lind & Ponack, L.L.P.

(57) ABSTRACT

A server scrambles received pay information in an internal scrambler and then transmits the result to a terminal which sent a request. A second charge managing portion determines a charge for the pay information for billing a contractor who manages the server, based on a coefficient of charge outputted from a terminal managing portion. The coefficient of charge is determined based on attributes of the terminal that uses the pay information, the number of the terminals which use the pay information, attributes of users who use the terminals, etc. The charge of use can thereby be obtained according to a degree of actual use at a users' side.

6 Claims, 14 Drawing Sheets

FIG. 4

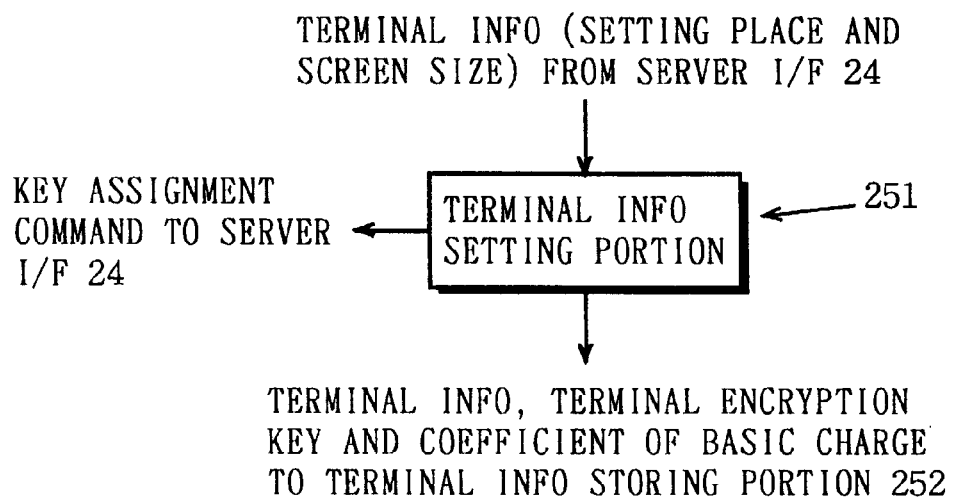

TERMINAL INFO (SETTING PLACE AND SCREEN SIZE) FROM SERVER I/F 24

KEY ASSIGNMENT COMMAND TO SERVER I/F 24 ← TERMINAL INFO SETTING PORTION ← 251

TERMINAL INFO, TERMINAL ENCRYPTION KEY AND COEFFICIENT OF BASIC CHARGE TO TERMINAL INFO STORING PORTION 252

|  | TERMINAL 3A | TERMINAL 3B | ... |
|---|---|---|---|
| TERMINAL ENCRYPTION KEY | Ka | Kb |  |
| INSTALLATION PLACE | LIVING | PRIVATE ROOM |  |
| SCREEN SIZE | 42 TYPE | 13 TYPE |  |
| COEFFICIENT OF BASIC CHARGE | 1.5 | 0.8 |  |

| DATE/TIME | IDENTIFIER OF TERMINAL | TITLE |
|---|---|---|
| T 1 | 「A」 | 「P」 |
| T 2 | 「B」 | 「P」 |
| : | : | : |

| THE AGGREGATE NUMBER OF TERMINALS | DISCOUNT RATE |
|---|---|
| 0 | 0 |
| 1 | 5 |
| 2 | 1 0 |
| : | : |

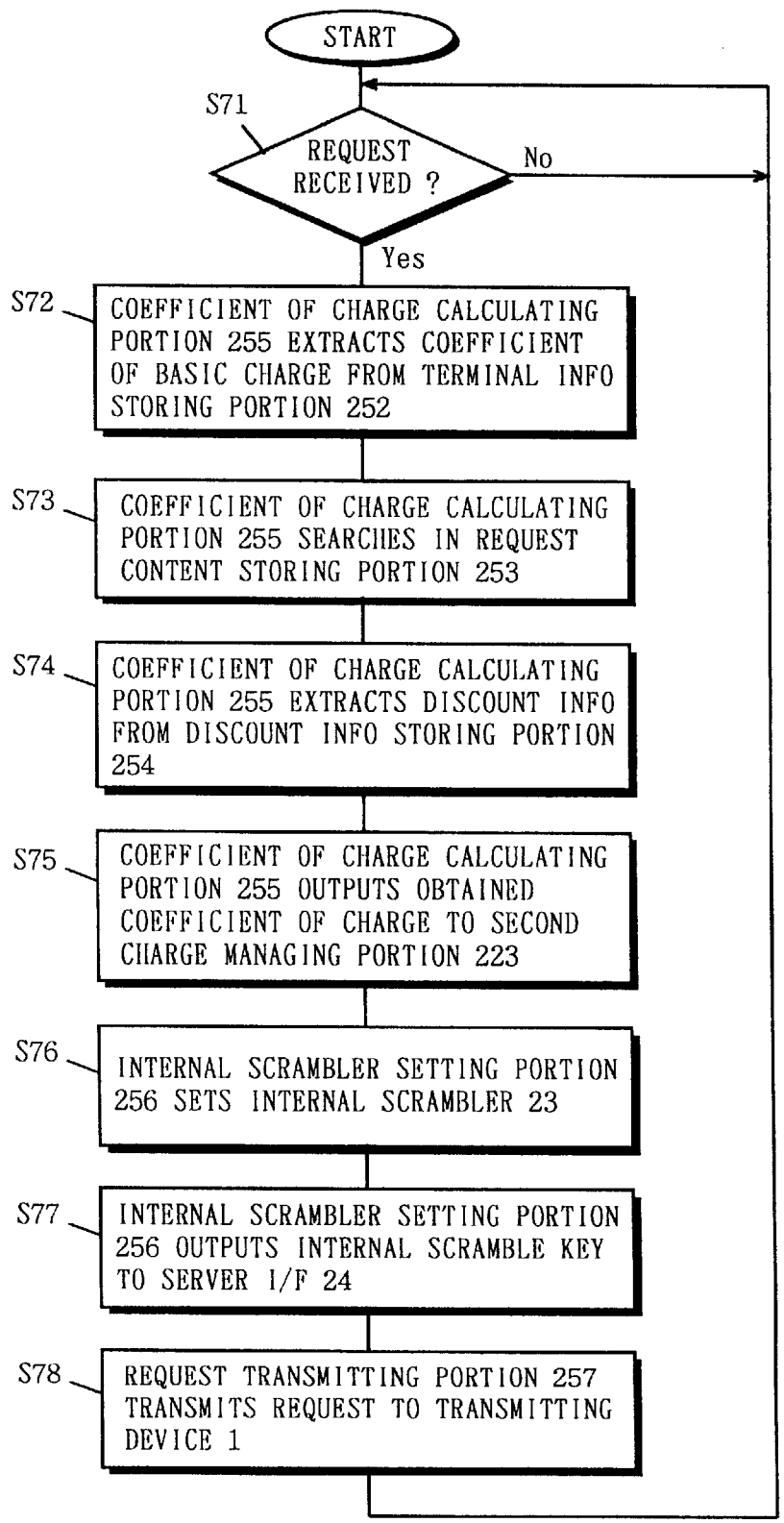

FIG. 9A

| TERMINAL TO RECEIVE TRANSMISSION | TITLE OF PAY INFORMATION | CHARGE |
|---|---|---|
| 3 A | 「P」 | 1.5×P' |
| ⁓ | ⁓ | ⁓ |
| TOTAL AMOUNT | | |

FIG. 9B

| TERMINAL TO RECEIVE TRANSMISSION | TITLE OF PAY INFORMATION | CHARGE |
|---|---|---|
| 3 A | 「P」 | 1.5×P' |
| 3 B | 「P」 | 0.76×P' |
| ⁓ | ⁓ | ⁓ |
| TOTAL AMOUNT | | (1.5×P')+ (0.76×P') |

PAY INFORMATION PROVIDING SYSTEM FOR DESCRAMBLING INFORMATION FROM PLURAL SOURCES AND RESCRAMBLING THE INFORMATION BEFORE SENDING TO A TERMINAL OR TERMINALS

BACKGROUND OF THE INVENTION

1. Field of the Invention

The present invention relates to pay information providing systems, and more specifically, relates to a system for providing pay information such as picture data, audio data, computer data, etc., from a transmitting station (a broadcast satellite, a communication satellite, a center station of CATV, a ground broadcast station, etc.) managed by an information provider to a receiving station which makes a receive contract with the information provider.

2. Description of the Background Art

As an example of accounting methods in the conventional pay information providing system, an accounting method in a pay broadcasting system using a broadcast satellite will be described. FIG. 16 is a block diagram showing the whole structure of the pay broadcasting system using a broadcast satellite. In FIG. 16, in the above pay broadcasting system, a transmitting device 100 transmitting pay information such as digitized picture and audio and a receiving device 107 receiving the pay information are connected through a transmission path 106. The receiving device 107 can receive the transmitted pay information and the like with an IC card 108 being set thereto.

The transmitting device 100 comprises a scramble key generating portion 101 generating a scramble key, a scrambler 102 scrambling pay information, a related information encrypting portion 103 encrypting related information (information concerning a contract with a user) and the scramble key, a charge managing portion 104 managing a charge to be made to the user, and a multiplex/transmitting portion 105 multiplexing and transmitting the scrambled pay information and the encrypted related information and the like.

The receiving device 107 comprises a receiving/demultiplex portion 109 receiving and demultiplexing the multiplexed pay information and the related information and the like, a descrambler 110 descrambling the pay information using the scramble key, and a picture/audio decoder 111 decoding the descrambled pay information to output picture data, audio data and like. The IC card 108 comprises a related information decrypting portion 112 decrypting the encrypted related information and the encrypted scramble key and a qualification judging portion 113 judging whether the receiving device 107 has qualification for receiving the pay information or not by examining the decrypted related information and giving the scramble key attached to the related information to the descrambler 110 only when the receiving device 107 has the qualification.

In the pay broadcasting system having the above structure, an information provider makes a charge for providing and using the pay information in such a manner as described below. First, the user purchases and installs equipment for receiving the pay information (the receiving device 107 and the IC card 108). At the same time, the user makes a contract in regard to providing the pay information with the information provider using communication means such as a telephone. Registered thereby in the transmitting device 100 managed by the information provider is the above mentioned contract information. This contact information is also registered in the qualification judging portion 113.

After finishing the above mentioned registration, when the transmitting device 100 receives a request from the user, the scramble key generating portion 101 generates a scramble key, sets the generated scramble key to the scrambler 102, and outputs the key to the related information encrypting portion 103. The related information encrypting portion 103 encrypts related information including the contract information of the user who sends the request and the like and the scramble key and outputs the result to the multiplex/transmitting portion 105. On the other hand, the scrambler 102 scrambles the requested pay information by using the set scramble key and then outputs the results to the multiplex/transmitting portion 105. The multiplex/transmitting portion 105 multiplexes the encrypted related information and scramble key and the scrambled pay information and transmits the result through the transmission path 106 to the receiving/demultiplex portion 109 in the receiving device 107. At this time, inputted in the charge managing portion 104 is the related information including the contract information of the user who sends the request and the like. In response, the charge managing portion 104 calculates a charge for using the pay information to the user and stores information about the charge for use.

The receiving/demultiplex portion 109 demultiplexes the information received through the transmission path 106 into the encrypted related information and scramble key and the scrambled pay information and outputs the former to the related information decrypting portion 112 and the latter to the descrambler 110, respectively. The related information decrypting portion 112 decrypts the encrypted related information and scramble key, and then outputs these to the qualification judging portion 113. The qualification judging portion 113 judges whether the user who holds the receiving device 107 makes the contract with the information provider or not based on the contract information included in the related information and the contract information registered therein, and outputs the inputted scramble key to the descrambler 110 only when judging positively. The descrambler 110 descrambles the inputted pay information and outputs the result to the picture/audio decoder 111. The pay information decoded by the picture/audio decoder 111 is outputted as picture data or audio data. The user thereby acquires the pay information from the information provider. The information provider managing the transmitting device 100 charges the user for use of the pay information at the time defined by the contract (at the end of the month, for example), based on information about charges stored in the charge managing portion 104.

By the way, recent technological innovation has upgraded infrastructure as to broadcasting and information communications, and various information (picture information, audio information, character information, figure information, etc.) can be obtained even at home from information providers. These kinds of information are transmitted to homes, for example, from a ground broadcast station, satellite broadcasting, or a communication satellite by radio, or, transmitted from a center station of CATV (Cable Television) through wire such as optical fiber cables.

Further, conventionally, it is a general style at home that only one television is installed in a living room or the like and all family members watch a television program. However, in recent years, televisions have been installed in a plurality of rooms and each individual watches his/her favorite television program. This personal-oriented trend will be more apparent in the future.

As described above, in order to allow acquisition of various information at each home and adapt the situation where the personal-oriented trend progresses, it can be suggested to construct two pay information providing systems as will described below. That is, in a first pay information providing system, the above mentioned receiving equipment (the receiving device 107 and the IC card 108) is installed in each room as required at home. On the other hand, in a second pay information providing system, one piece of the receiving equipment is installed per household and the pay information is branched to be inputted to a television in each room. Each individual at home watches the pay information using the individual television.

However, when the above first pay information providing system is adapted, it is required to install the receiving equipment (the receiving device 107 and the IC card 108) in each room as required at home, thereby increasing initial expenses for the equipment at the user's side. Further, in the first pay information providing system, it is required to make a plurality of contracts with the information provider, in response to the number of installed receiving equipment. Therefore, when the same television program is watched by two televisions in one home, the household has to pay a double charge for use for the same television program. However, the user seems to feel uncomfortable to pay the double charge for the same television program.

On the other hand, when the above second pay information providing system is adapted, it is a disadvantage that billing cannot be made in response to the number of televisions. More specifically, for example, assume that one receiving equipment is installed in one home and ten televisions are connected to the receiving equipment. In this case, either when a television program is watched by one television or when a television program is watched by ten televisions, the charges which are paid to the information provider are the same. However, the information provider seems to want to bill the household for charges according to the number of the installed televisions. The user who holds only one television seems to think unreasonable to be billed for the same charges as the user who holds ten televisions.

SUMMARY OF THE INVENTION

Therefore, an object of the present invention is to provide a pay information providing system capable of obtaining a charge for use in response to an actual degree of use at a user's side.

Another object of the present invention is to provide a pay information providing system capable of reducing initial expenses for equipment at a user's side and also dispensing with multiple contracts with an information provider.

The present invention has the following features to achieve the objects above.

A first aspect of the present invention is directed to a system for providing pay information from a transmitting station to a receiving station,
the receiving station comprising:
one server, and
a plurality of terminals which are operated by a user for using the pay information,
the server comprising:
a receiving portion for receiving the pay information transmitted from the transmitting station,
a distributing portion for distributing the pay information received by the receiving portion to the terminal which makes a request for providing the pay information,
a use situation managing portion for managing use situations of the pay information at each of the terminals based on the request transmitted from each of the terminals,
a charge calculating portion for calculating a charge for use of the pay information based on the use situations managed by the use situation managing portion, and
a charge storing portion for storing the charge for use calculated by the charge calculating portion.

As described above, in accordance with the first aspect, the server manages the use situations of the pay information at each terminal and calculates a charge for use of the pay information at each terminal from the use situations, thereby allowing to calculate a charge in response to a degree of actual use of the pay information regardless of the number of terminals one contractor holds. Further, in accordance with the first aspect, one server as receiving equipment is all that is necessary to be installed for the contractor at each receiving station, which reduces expenses for equipment at the user's side.

According to a second aspect, in the first aspect,
terminal information indicating attributes of each of the terminals is registered in the server, and
the charge calculating portion calculates a charge for use differentiated for each of the terminals by referring to the terminal information when calculating the charge for use.

As described above, in accordance with the second aspect, terminal information indicating attributes of each terminal is registered in the server, and by referring to the terminal information at the time of calculating the charge for use, the charge for used differentiated for each of the terminal is calculated. Flexible charge calculation is thereby possible also considering the attributes of the terminal using the pay information (such as an installation place, a screen size).

According to a third aspect, in the second aspect,
when transmitting the pay information to the receiving station, the transmitting station simultaneously transmits basic charge information for defining basic charge for use of the pay information to the receiving station,
the terminal information includes a coefficient of charge in response to attributes of each of the terminals, and
the charge calculating portion calculates a charge for use of the pay information for each of the terminals by multiplying the basic charge defined by the basic charge information by the coefficient of charge.

As described above, in accordance with the third aspect, the charge calculating portion calculates a charge for use of the pay information for each of the terminals by multiplying the basic charge information transmitted from the transmitting station by the coefficient of charge in response to the attributes of each of the terminals. Therefore, the information provider who manages the transmitting station can easily perform change in charge for the pay information to each of the terminals only by changing the basic charge information.

According to a fourth aspect, in the third aspect,
the distributing portion further transmits the basic charge information transmitted from the transmitting station to each of the terminals, and
each of the terminals displays the basic charge information received for the user.

As described above, in accordance with the fourth aspect, the basic charge information transmitted from the transmitting station is displayed through the terminal for the user. Therefore, the user who operates the terminal can determine whether to use the pay information referring to the displayed basic charge information.

According to a fifth aspect, in the second aspect, discount information is set to the server based on that the terminal information is provided for the transmitting station, and when the terminal information of the terminal which makes a request for providing the pay information is provided for the transmitting station, the charge calculating portion calculates a discounted charge for use referring to the discount information.

For the information provider who manages the transmitting station, information about through which terminal the provided pay information is used is a great interest in view of audience research and marketing research. However, since the terminal information held at the receiving station is information relating to privacy for individuals, unconditional display of the information to the transmitting station will damage the user's interest. Therefore, in accordance with the fifth aspect, for the user who provides the terminal information of the terminal which used the pay information for the transmitting station, the charge for use of the pay information is discounted, thereby promoting providing the terminal information and realizing the pay information providing system which benefits both of the information provider and the user.

According to a sixth aspect, in the first aspect, user information indicates attributes of a user who uses each of the terminals, and the charge calculating portion calculates a charge for use differentiated for each user by referring to the user information when calculating the charge for use.

As described above, in accordance with the sixth aspect, terminal information indicating attributes of each terminal is registered in the server, and by referring to the terminal information at the time of calculating the charge for use, the charge for use differentiated for each of the terminal is calculated. Flexible charge calculation is thereby possible also considering the attributes of the user using the pay information (such as an adult, a child).

According to a seventh aspect, in the sixth aspect, when transmitting the pay information to the receiving station, the transmitting station simultaneously transmits basic charge information for defining basic charge for use of the pay information to the receiving station, the terminal information includes a coefficient of charge in response to the attributes of each user, and the charge calculating portion calculates a charge for use of the pay information for each user by multiplying the basic charge defined by the basic charge information by the coefficient of charge.

As described above, in accordance with the seventh aspect, the charge calculating portion calculates a charge for use of the pay information for each of the users by multiplying the basic charge information transmitted from the transmitting station by the coefficient of charge in response to the attributes of each of the users. Therefore, the information provider who manages the transmitting station can easily perform change in charge for the pay information to each of the users only by changing the basic charge information.

According to an eighth aspect, in the seventh aspect, the distributing portion further transmits the basic charge information transmitted from the transmitting station to each of the terminals, and each of the terminals displays the basic charge information for the user.

As described above, in accordance with the eighth aspect, the basic charge information transmitted from the transmitting station is displayed through the terminal for the user. Therefore, the user who operates the terminal can determine whether to use the pay information referring to the displayed basic charge information.

According to a ninth aspect, in the sixth aspect, discount information is set to the server based on that the terminal information is provided for the transmitting station, and when user information of the user who operates the terminal making a request for providing the pay information is provided for the transmitting station, the charge calculating portion calculates a discounted charge for use referring to the discount information.

For the information provider who manages the transmitting station, information about by what kind of user the provided pay information is used is a great interest in view of audience research and marketing research. However, since the user information held at the receiving station is information relating to privacy for individuals, unconditional display of the information to the transmitting station will damage the user's interest. Therefore, in accordance with the ninth aspect, for the user who provides the user information of the user which used the pay information for the transmitting station, the charge for use of the pay information is discounted, thereby promoting providing the terminal information and realizing the pay information providing system which benefits both of the information provider and the user.

According to a tenth aspect, in the first aspect, the use situation managing portion holds use history of the pay information at each of the terminals, and the charge calculating portion increases a discount rate of the charge for use of the pay information which is used frequently by referring to the use history when calculating the charge for use.

When the same pay information is used in a plurality of times, if the same charge is applied for every use, people would not feel like using the same pay information again. Therefore, in accordance with the tenth aspect, use history of the pay information at each of the terminals is held, and by referring to the use history at the time of calculating the charge for use, a discount rate of the charge for use of the pay information which is used frequently is increased. This allow to decrease a load of charge of the user and to promote repeated use of the same pay information.

According to an eleventh aspect, in the first aspect, the charge calculating portion is installed in a field which the user cannot operate.

As described above, in accordance with the eleventh aspect, the charge calculating portion is installed in a field which the user cannot operate, thereby preventing the charge for use calculated by the charge calculating portion from being tampered with without authority.

According to a twelfth aspect, in the first aspect, the distributing portion further transmits the request transmitted from each of the terminals, in response to an instruction from a prescribed terminal, to the terminal, and the prescribed terminal provides the request received for the user.

As described above, in accordance with the twelfth aspect, the request transmitted by each terminal can be checked at the prescribed terminal. Therefore, for example, parents can monitor what kind of pay information their children will use, and can prevent in advance use of the pay information which will have a bad effect on the children.

According to a thirteenth aspect, in the first aspect, the receiving station makes a receive contract with a plurality of the transmitting stations, and the receiving portion and the charge calculating portion are installed corresponding to each of the transmitting stations which makes the receive contract.

As described above, in accordance with the thirteenth aspect, the receiving portion and the charge calculating portion are installed corresponding to each of the plurality of the transmitting stations which makes the receive contract. Therefore, the receiving station can receive the pay information from the plurality of the transmitting stations and calculate a charge for each of the transmitting stations.

According to a fourteenth aspect, in the first aspect, the transmitting station scrambles and then transmits the pay information, the receiving portion further descrambles the received pay information, the distributing portion rescrambles and then distributes the pay information descrambled by the receiving portion to the terminal which sends the request, and each of the terminals descrambles and then uses the rescrambled pay information received from the distributing portion.

As described above, in the fourteenth aspect, the receiving station once cancels scrambling of the pay information transmitted from the transmitting station and rescrambles to distribute the pay information to each terminal. Therefore, if a scrambling method is different at each transmitting station, it is possible to unify the scrambling method in the receiving station. As a result, it is not required to install a descrambler for each transmitting station at each terminal.

According to the fifteenth aspect, in the fourteenth aspect, a scramble key which is unique to each of the terminals is previously set to the server, a unique descramble key is previously set to each of the terminals, the distributing portion rescrambles the pay information descrambled by the receiving portion using the corresponding scramble key and then distributes the terminal which sends the request, and each of the terminals descrambles and then uses the rescrambled pay information received from the distributing portion using the descramble key previously set.

As described above, in accordance with the fifteenth aspect, the server side rescrambles the pay information with the scramble key unique to each of the terminals, and the terminal side descrambles the received rescrambled pay information with its own descramble key previously set, thereby preventing the pay information distributed from the server to the prescribed terminal from being used undesired at other terminals.

According to a sixteenth aspect, in the fourteenth aspect, an encryption key which is unique to each of the terminals is previously set to the server, and a unique decryption key is previously set to each of the terminals, the distributing portion generating a random number, rescrambling the pay information descrambled by the receiving portion using the random number, encrypting the random number using the encryption key which corresponds thereto, and distributing the rescrambled pay information and the encrypted random number to the terminal which sends the request, and each of the terminals decrypting the encrypted random number received from the distributing portion using the encryption key previously set, and descrambling the rescrambled pay information received from the distributing portion using the decrypted random number.

As described above, in the sixteenth aspect, the server side rescrambles the pay information with the random number and further encrypts the random number with the encryption key unique to each of the terminals, and the terminal side decrypts the received encrypted random number with its own decryption key previously set and further descrambles the rescrambled pay information with the decrypted random number. Therefore, as in the above fifteenth aspect, compared to a case of rescrambling the pay information with the same scramble key every time, it is possible to more safely distribute the pay information to a specific terminal.

According to a seventeenth aspect, in the first aspect, a plurality of the receiving stations exist, further comprising a hand-held electronic value holding device for using an electronic value given at a specific receiving station at other receiving stations, when a request for giving the electronic value is inputted with the electronic value holding device being set, the specific receiving station gives the electronic value to the electronic value holding device, when a request for using the pay information is generated with the electronic value holding device being set, the other receiving stations transfer the charge for use of the pay information calculated by the charge calculating portion, without being stored in the charge storing portion, to the electronic value holding device and the electric value holding device set to the other receiving stations reimburses the charge for use transferred from the server of the other receiving stations by the given electronic value.

As described above, in accordance with the seventeenth aspect, the user who belongs to the specific receiving station can use the pay information through the terminal at the other receiving stations. Further, the charge for use of the pay information is made to not the user of the other receiving stations but to the user who actually used the pay information. This allows construction of a usable pay information providing system.

According to an eighteenth aspect, in the seventeenth aspect, the specific receiving station and the other receiving stations are respectively capable of receiving the pay information from one or more transmitting stations, the electronic value holding device stores first identification information for respectively identifying the transmitting stations from which the specific receiving station is capable of receiving, second identification information for respectively identifying the transmitting stations from which the other receiving stations are capable of receiving is registered in the other receiving stations, and when a request for using the pay information is generated with the electronic value holding device being set, the server of the other receiving stations determines whether the pay information is available or not based on the first and second identification information, and transfers the charge for use of the pay information calculated by the charge calculating portion to the electronic value holding device only when determining that the pay information is available.

There is a case that a unreceivable transmitting station at a specific receiving station can be receivable at other receiving stations. When pay information from such transmitting station is used by other receiving stations with the electronic value holding device, disbursement of the charge for use cannot be made. Therefore, in the eighteenth aspect, when a request for using pay information using the electronic value holding device is occurred, a receivable transmitting station at a specific receiving station to which the electronic value holding device belongs is checked against a receivable transmitting station at other receiving stations to which the electronic value holding device is set, and the pay information can be used only when the transmitting station providing the requested pay information is receivable at any of the receiving stations, thereby transferring the charge for use of the pay information to the electronic value holding device.

According to a nineteenth aspect, in the first aspect, a plurality of the receiving stations exist, further comprising a hand-held credit holding device capable of using the pay information for an amount equal to credit given to a specific receiving station at other receiving stations, when a request for giving credit is inputted with the credit holding device being set, the specific receiving station gives to the credit holding device credit equal to an amount previously defined, when a request for using the pay information is generated with the credit holding device being set, the other receiving stations transfer the charge for use of the pay information calculated by the charge calculating portion, without being stored in the charge storing portion, to the credit holding device, the credit holding device set in the other receiving stations accumulates the charges for use transferred from the server, and when a request for reimbursement is inputted with the credit holding device being set, the specific receiving station inputs an accumulated value of the charges for use held in the credit holding device and adds to the charge for use of the pay information stored in the charge storing portion.

As described above, in accordance with the nineteenth aspect, the user who belongs to the specific receiving station can use the pay information through the terminal at the other receiving stations. Further, the charge for use of the pay information is made not to the user of the other receiving stations but to the user who actually used the pay information. This allows construction of a usable pay information providing system.

According to a twentieth aspect, in the nineteenth aspect, the specific receiving station and the other receiving stations are respectively capable of receiving the pay information from one or more transmitting stations, the credit holding device stores first identification information for respectively identifying the transmitting stations from which the specific receiving station is capable of receiving, second identification information for respectively identifying the transmitting stations from which the other receiving station are capable of receiving is registered in the other receiving stations, when a request for using the pay information is generated with the credit value holding device being set, the server of the other receiving stations determines whether the pay information is available or not based on the first and second identification information, and transfers the charge for use of the pay information calculated by the charge calculating portion to the credit holding device only when determining that the pay information is available.

There is a case that a unreceivable transmitting station at an specific receiving station can be receivable at other receiving stations. When pay information from such transmitting station is used by other receiving stations with a credit holding device, disbursement of the charge for use cannot be made. Therefore, in the twentieth aspect, when a request for using pay information using the credit holding device is occurred, a receivable transmitting station at a specific receiving station to which the credit holding device belongs is checked against a receivable transmitting station at other receiving stations to which the credit holding device is set, and the pay information can be used only when the transmitting station providing the requested pay information is receivable at any of the receiving stations, thereby transferring the charge for use of the pay information to the credit holding device.

According to a twenty-first aspect, in the first aspect, the server further comprises a information recording portion for recording the pay information received by the receiving portion, when a request for using the pay information recorded in the information recording portion is sent from each of the terminals, the distributing portion reads out the corresponding pay information from the information recording portion and distributes to the terminal which sends the request, and the charge calculating portion calculates a charge for use of the pay information every time the pay information recorded in the information recording portion is distributed to the terminal.

As described above, in accordance with the twenty-first aspect, the received pay information is recorded, and the recorded pay information is read out and distributed in response to the request from the terminal. Therefore, the user can use the once received pay information a number of times without receiving the pay information again. On the other hand, the charge calculating portion calculates a charge for use of the pay information every time the pay information recorded in the information recording portion. Therefore, the information provider can make a charge in response to the number of times of use.

According to a twenty-second aspect, in the twenty-first aspect, pay information received at an arbitrary first receiving station is available at an arbitrary second receiving station which is different from the first receiving station.

As described above, in the twenty-second aspect, the pay information received at a certain receiving station can be used at any other receiving station, thereby allowing to construct a highly flexible pay information providing system.

According to a twenty-third aspect, in the twenty-second aspect, the server of the first receiving station, when a request for using the pay information recorded in the information recording portion of its own station at the second receiving station is inputted, creates authorization data defining use conditions of the pay information, and based on the created authorization data, calculates charge for use of the pay information and stores the charge in the charge storing portion, the authorization data created in the first receiving station and the pay information recorded in the information recording portion of the first receiving station are transmitted to the second receiving station, and each of the terminals in the second receiving station allows the pay information transmitted from the first receiving station to be used only when the use conditions defined by the authorization data transmitted from the first receiving station are satisfied.

As described above, in the twenty-third aspect, when the pay information received at the first receiving station is used at the second receiving station, it is possible to make a charge for use to the first receiving station.

According to a twenty-fourth aspect, in the twenty-second aspect, the server of the first receiving station, when a request for using pay information recorded in the information recording portion of its own station at the second receiving station is inputted, creates authorization data defining use conditions of the pay information, the authorization data created in the first receiving station and the pay information recorded in the information recording portion of the first receiving station are transmitted to the second receiving station, and each of the terminals in the second receiving station allows the pay information transmitted from the first receiving station to be used only when the use conditions defined by the authorization data transmitted from the first receiving station are satisfied, and based on the authorization data and the transmitted pay information, calculates charge for use of the pay information and stores the charge in the charge storing portion of its own station.

As described above, in the twenty-fourth aspect, when the pay information received at the first receiving station is used at the second receiving station, it is possible to make a charge for use to the second receiving station.

According to a twenty-fifth aspect, in the twenty-first aspect, an external terminal which is not connected online to the server is provided, when a request for using pay information recorded in the information recording portion at the external terminal is inputted, the server creates authorization data defining use conditions of the pay information, and based on the created authorization data, calculates charge for use of the pay information and stores the charge in the charge storing portion.

the authorization data created by the server and the pay information recorded in the information recording portion are transmitted to the external terminal, and the external terminal allows the pay information transmitted from first receiving station to be used only when the use conditions defined by the authorization data transmitted from the receiving station are satisfied.

As described above, in accordance with the twenty-fifth aspect, the pay information received at the receiving station can be used at an external terminal which is not connected to the server, thereby allowing the construction of a highly flexible pay information providing system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the contents of operation of a terminal information setting portion 251 shown in FIG. 3.

FIG. 5 is a diagram showing an example of the contents stored in a terminal information storing portion 252 shown in FIG. 3.

FIG. 6 is a diagram showing an example of the contents stored in a request content storing portion 253 shown in FIG. 3.

FIG. 7 is a diagram showing an example of the contents stored in a discount information storing portion 254 shown in FIG. 3.

FIG. 8 is a flow chart showing operational procedures of the terminal managing portion 25 shown in FIG. 2.

FIGS. 9A and 9B are diagrams showing an examples of charges stored in a memory which a second charge managing portion 223 shown in FIG. 2 has therein.

DESCRIPTION OF THE PREFERRED EMBODIMENTS

Figure 1:
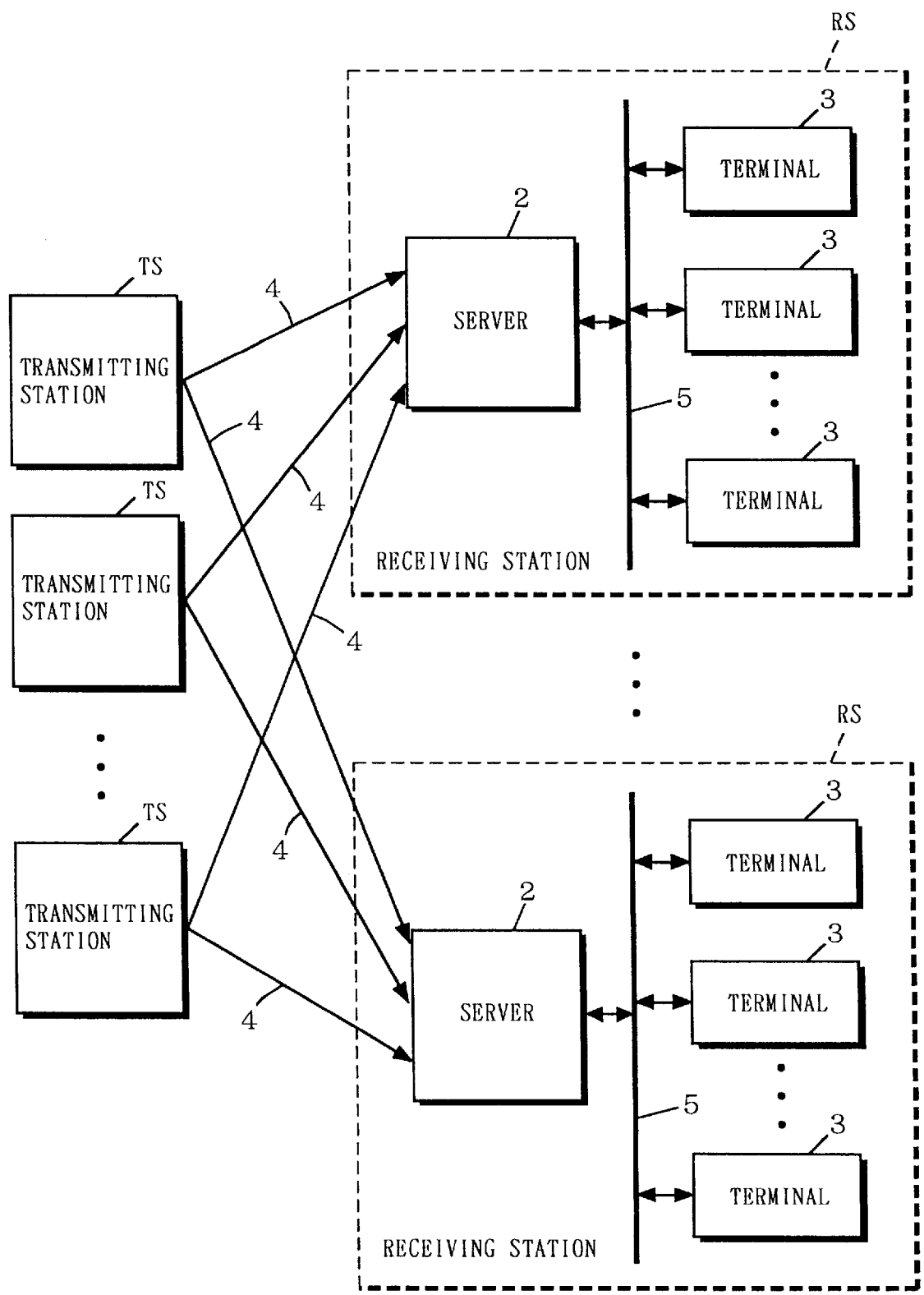
FIG. 1 is a block diagram showing the whole structure of a pay information providing system according to a first embodiment of the present invention.

Embodiments of the present invention will now be described below referring to the drawings. In the present specification, to scramble means to manipulate pay information (a signal or data) to prevent the original pay information from being recovered unless certain information is known, and generally includes a notion of encryption.

First Embodiment

FIG. 1 is a block diagram showing the structure of a pay information providing system according to a first embodiment of the present invention. In FIG. 1, the pay information providing system of the present embodiment comprises a plurality of transmitting stations TS and a plurality of receiving stations RS. Each transmitting station TS and each receiving station RS are connected through a transmission path 4 by wire or radio.

The transmitting station TS is a broadcast satellite, a communication satellite, a center station of CATV, a ground broadcast station or the like managed by an information provider, and transmits pay information such as picture/audio data, character data, and computer data.

The receiving station RS includes a server 2 and a plurality of terminals 3. The server 2 and the terminals 3 are connected through a local bus 5. The terminal 3 is a television set, a computer device or the like, which uses the pay information transmitted from the server 2 in a certain form (display, audio output, data processing, etc). The server 2 receives the pay information transmitted from the transmitting stations TS and distributes the pay information to each terminal 3. The server 2 also manages use situations of the pay information at each terminal 3 based on a request from each terminal 3, and calculates a charge for using the pay information at each terminal 3 from the use situations. The receiving station RS is installed for each contractor (typically, a household or a business establishment) who makes a receive contract with the information provider. However, when a house complex such as a condominium is the receiving station, one server 2 may be provided for the whole house complex and the terminal 3 may be provided for each household.

Generally, each transmitting station TS scrambles and transmits the pay information to prevent the pay information from being used without permission. The scramble methods at transmitting stations TS are different from each other and the transmitting methods are also different from each other. The server 2 unifies the format of the pay information by receiving and descrambling the pay information transmitted from each transmitting station TS so as to allow any terminal to use the pay information. However, when the pay information is distributed from the server 2 to the terminal 3, it is preferable to rescramble the pay information using a unique scramble key for each terminal. The pay information transmitted on the local bus 5 thereby becomes usable only at a specific terminal 3.

The pay information received and descrambled by the server 2 is, in one case, immediately outputted to the terminal 3 and used in real time at the terminal 3. In another case, the pay information received and descrambled by the server 2 is temporarily recorded in the server 2, then read out according to a request from the terminal 3, and used at the terminal 3, etc. In either case, the server 2 can calculate and manage a charge for use in response to a degree of using the pay information.

As described above, according to the first embodiment, the server 2 manages use situations of the pay information at each terminal 3 and calculates from the use situations a charge of use of the pay information at each terminal 3. Therefore, regardless of the number of the terminals one contractor holds, it is possible to calculate a charge for use in response to a degree of actual use of the pay information.

Further, according to the first embodiment, one server 2 as receiving equipment is all that is necessary to be installed for the contractor at each receiving station, which reduces expenses for equipment at a user's side.

Second Embodiment

Next, a second embodiment of the present invention will be described. The second embodiment is constructed as a system further embodying the above described first embodiment.

Figure 2:
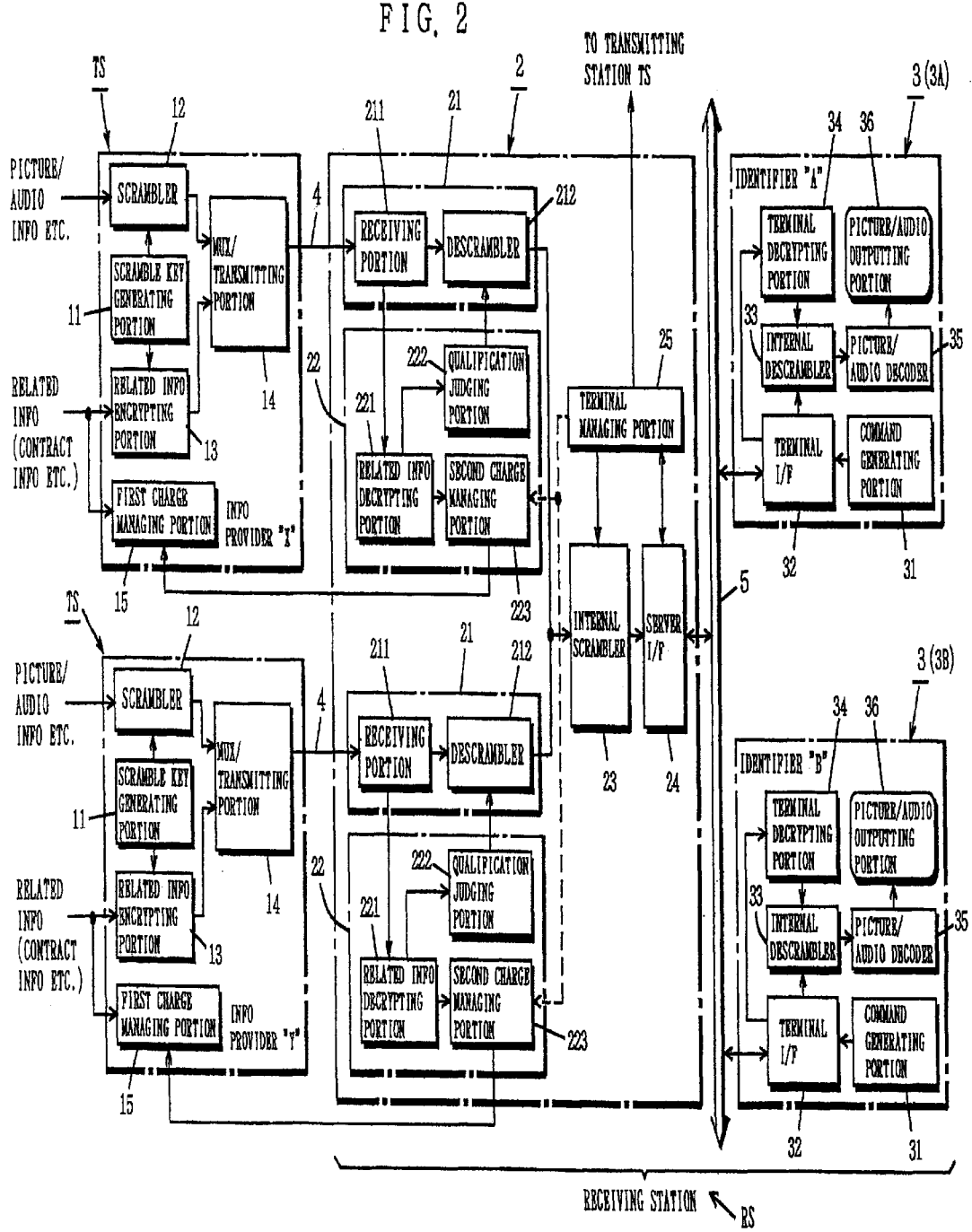
FIG. 2 is a block diagram showing the whole structure of a pay information providing system according to a second embodiment of the present invention.

FIG. 2 is a block diagram showing the whole structure of a pay information providing system according to the second embodiment of the present invention. In FIG. 2, the pay information providing system of the present embodiment comprises a transmitting station TS and a receiving station RS, as in the first embodiment shown in FIG. 1. The transmitting station TS and the receiving station RS are connected through a transmission path 4 by wire or radio. Although in FIG. 2, as an example, two transmitting stations TS and one receiving station RS are shown, the number of the transmitting stations TS connected to one receiving station RS varies according to the number of the receive contracts, and may be one, or three or more.

The transmitting station TS is a broadcast satellite, a communication satellite, a center station of CATV, a ground broadcast station or the like managed by an information provider, and transmits pay information such as picture/audio data, character data, and computer data.

The receiving station RS includes a server 2 and a plurality of terminals 3. The server 2 and the terminals 3 are connected through a local bus 5. The terminal 3 is a television set, a computer device or the like, which uses the pay information transmitted from the server 2 in a certain form (display, audio output, data processing, etc). The server 2 receives the pay information transmitted from the transmitting stations TS and distributes the pay information to each terminal 3. The server 2 also manages use situations of the pay information at each terminal 3 based on a request from each terminal 3, and calculates a charge for using the pay information at each terminal 3 from the use situations. The receiving station RS is installed for each contractor (typically, a household or a business establishment) who makes a receive contract with the information provider. However, when a house complex such as a condominium is the receiving station, one server 2 may be provided for the whole house complex and the terminal 3 may be provided for each household. The more detailed structure of the transmitting station TS, the server 2 and the terminals 3 will be described below.

The transmitting station TS comprises a scramble key generating portion 11, a scrambler 12, a related information encrypting portion 13, a multiplex/transmitting portion 14 and a first charge managing portion 15. Although each transmitting station TS has basically the same structure, in many cases, each scrambler 12 in each station performs scrambling with different scramble methods based on a security policy of each in formation provider, etc.

The server 2 comprises a plurality of receiving devices 21, IC cards 22 corresponding to the receiving devices 21, an internal scrambler 23, a server I/F 24 and a terminal managing portion 25. Each receiving device 21 includes a receiving portion 211 and a descrambler 212, and has the structure corresponding to the transmitting method of the above transmitting station TS. For example, when the transmitting station TS is a broadcast satellite, the corresponding receiving device 21 is a receiving device for the broadcast satellite, and when the transmitting station TS is a center station of CATV, the corresponding receiving device 21 is a receiving device for CATV. The above IC card 22 includes a related information decrypting portion 221, a qualification judging portion 222 and a second charge managing portion 223. When receiving a request from the terminal 3 through the server I/F 24, the terminal managing portion 25 executes a processing of obtaining a coefficient of charge, a setting processing of the internal scrambler 23 and a processing of transmitting the request. The detailed structure of the terminal managing portion 25 will be described below.

Figure 3:
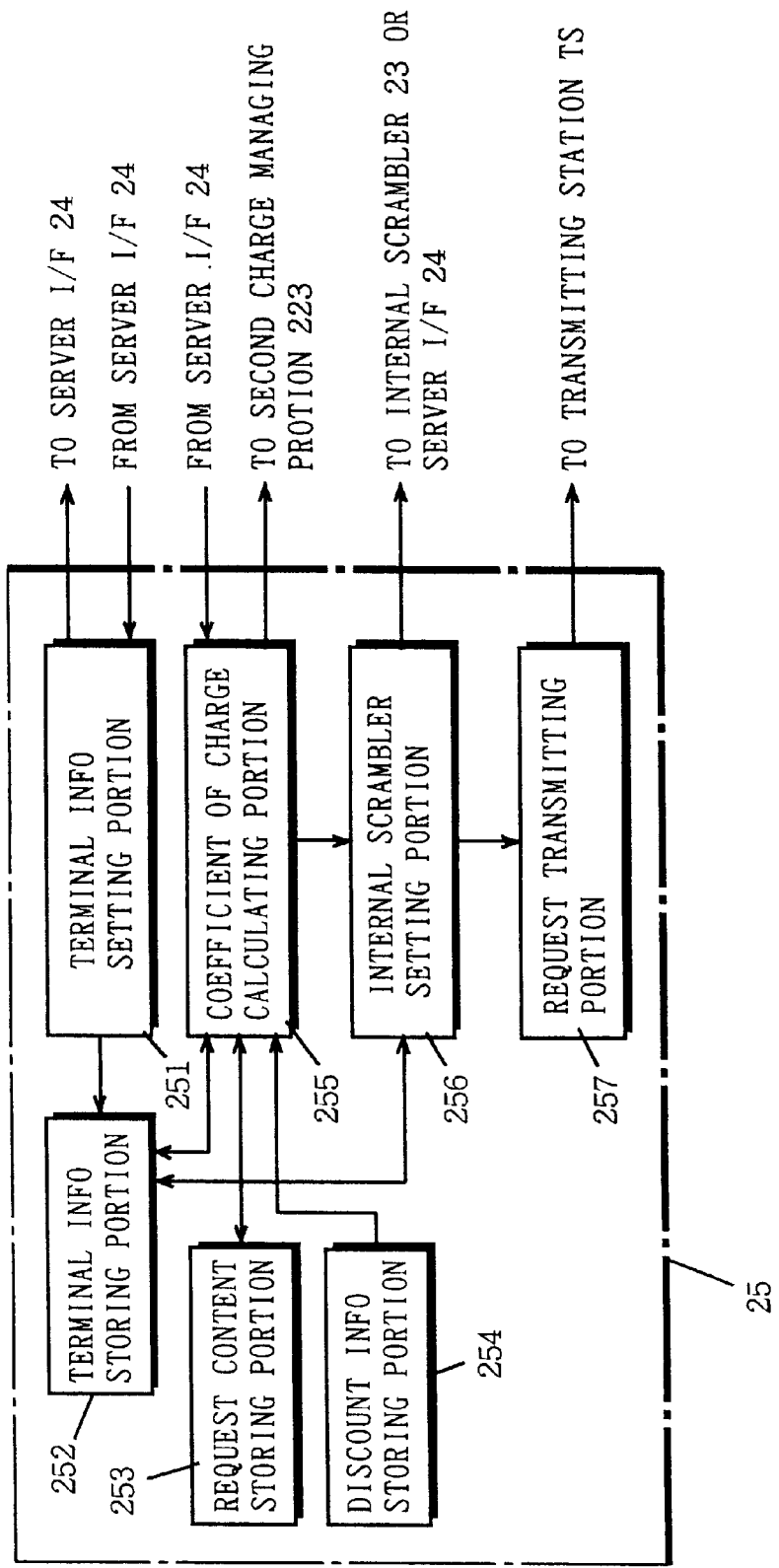
FIG. 3 is a block diagram showing the more detailed structure of a terminal managing portion 25 shown in FIG. 2.

FIG. 3 is a block diagram showing the structure of the terminal managing portion 25 shown in FIG. 2. The terminal managing portion 25 includes a terminal information setting portion 251, a terminal information storing portion 252, a request content storing portion 253, a discount information storing portion 254, a coefficient of charge calculating portion 255, an internal scrambler setting portion 256 and a request transmitting portion 257.

When an initialization command (its detail will be described later) generated by the terminal 3 is inputted through the server I/F 24, the terminal information setting portion 251 assigns a terminal encryption key and a coefficient of basic charge to the terminal 3. Next, the terminal information setting portion 251 sets the assigned terminal encryption key and coefficient of basic charge and terminal information as to attributes of the terminal which are included in the initialization command (an installation place of terminal 3, a screen size, etc.) to the terminal information storing portion 252 (refer to FIG. 4). The terminal information setting portion 251 generates a terminal decryption key for use in decrypting an encrypted internal scramble key (which is encrypted with the assigned terminal encryption key), and transmits a key assignment command including the terminal decryption key to the terminal 3 which generated the above initialization command through the server I/F 24.

As shown in FIG. 5, the terminal information storing portion 252 stores the terminal information (the installation place, the screen size), the terminal encryption key and the coefficient of basic charge. By the way, in the present embodiment, identifiers are previously given to the terminals 3. "A" is given to one of the terminals 3 shown in FIG. 2 as an identifier (this terminal is hereinafter referred to as a terminal 3A), "B" is given to the other (this terminal is hereinafter referred to as a terminal 3B). In this case, the terminal information storing portion 252 stores the terminal information of each of the terminals 3A and 3B.

As shown in FIG. 6, the request content storing portion 253 stores date/time information indicating when a request is generated, an identifier of the terminal 3 which generated the request and a title of the pay information included in the request. FIG. 6 shows the contents which the request content storing portion 253 stores when the terminal 3A generates a request for pay information with a title "P" at date/time indicated by "T1" and further when the terminal 3B generates a request for pay information with a title "P" at date/time indicated by "T2". In this manner, the request content storing portion 253 manages requests transmitted from the terminals 3 which are connected to the server 2.

As shown in FIG. 7, the discount information storing portion 254 stores the aggregate number of the terminals which request the same program and discount rates corresponding to the aggregate number. In an example shown in FIG. 7, when the aggregate number are 0, 1, and 2, the discount rates are set to 0, 5, and 10%, respectively. The discount rate storing portion 254 may store discount charge corresponding to the number of the installed terminals.

The coefficient of charge calculating portion 255 calculates the coefficient of charge based on the inputted request, and then outputs the request to the internal scrambler setting portion 256. The internal scrambler setting portion 256 generates an internal scramble key for scrambling the pay information to be transmitted to the terminal 3 which generated the request, and sets the internal scramble key to the internal scrambler 23. Next, the internal scrambler setting portion 256 extracts the terminal encryption key assigned to the terminal 3 which generated the request from the terminal information storing portion 252. Next, the internal scrambler setting portion 256 encrypts the generated internal scramble key using the extracted terminal encryption key, and then transmits the encrypted internal scramble key to the terminal 3 which generated the request through the server I/F 24. Next, the internal scrambler setting portion 256 outputs the request received from the coefficient of charge calculating portion 255 to the request transmitting portion 257. The request transmitting portion 257 transmits the request to the transmitting station TS which transmits the pay information specified by the request.

The terminal 3 comprises a command generating portion 31, a terminal I/F 32, an internal descrambler 33, a terminal decrypting portion 34, a picture/audio decoder 35, and a picture/audio outputting portion 36. Here, each terminal 3 has the same structure, while a unique identifier is previously given to each terminal 3, as described above. Further, stored in memory (not shown) which each terminal decrypting portion 34 has therein is the terminal decryption key previously assigned by the terminal information setting portion 251.

The receiving station RS having the structure as described above is installed in a house, etc. of the user who bought it, etc. Further, in order to be provided with pay information from an information provider in a household unit, the user makes a contract with the information provider. Registered thereby in the transmitting station TS managed by the information provider are contract information as to the contract with the user and an encryption key for the server 2 (hereinafter referred to as a server encryption key). Further, the contract information is also registered in the qualification judging portion 222. Stored in the related information decrypting portion 221 of the IC card 22 corresponding to the transmitting station TS is a server decryption key capable of decrypting the encrypted scramble key (which is encrypted with the server encryption key) and the like. When the contract is made, initialization is performed first. In this initialization, the command generating portion 31 in the terminal 3 generates an initialization command according to an input of the user, and outputs the command to the terminal I/F 32. This initialization command includes the identifier and terminal information of the terminal 3, being outputted to the local bus 5 by the terminal I/F 32 and being inputted to the server I/F 24. The initialization command is then outputted by the server I/F 24 to the terminal information setting portion 251 in the terminal managing portion 25.

The terminal information setting portion 251 assigns the terminal encryption key and the coefficient of basic charge for the terminal 3 which generated the initialization command, and then stores in the terminal information storing portion 252 the identifier and the terminal information of the terminal 3 which are included in the initialization command and the assigned coefficient of basic charge and terminal encryption key (refer to FIG. 4 and FIG. 5). As described above, the terminal information setting portion 251 generates a terminal decryption key corresponding to the assigned terminal encryption key, and then generates and outputs a key assignment command to the server I/F 24. The key assignment command includes the identifier of the terminal 3 which generated the above initialization command and the terminal decryption key generated for the terminal 3, being outputted to the local bus 5 by the server I/F 24 and being inputted to the terminal I/F 32 of the terminal 3 which generated the above initialization command. The terminal I/F 32 outputs the inputted key assignment command to the terminal decrypting portion 34. The terminal decrypting portion 34 extracts the terminal decryption key included in the inputted key assignment command, and then stores the extracted terminal decryption key in its internal memory. The initialization is thereby completed, allowing the terminal 3 to generate a request for pay information.

In this embodiment, assume that to the terminals 3A and 3B, terminal encryption keys "Ka" and "Kb" are assigned and coefficients of basic charge "1.5" and "0.8" are set, respectively (refer to FIG. 5). The terminal 3A, whose screen size is large, is installed in a living room. Therefore, it is assumed that a plurality of users use pay information simultaneously. Accordingly, the coefficient of basic charge is set to "1.5" so as to increase a charge for the pay information. Conversely, for the terminal 3B, it is assumed from its attributes that an individual uses the pay information. Therefore, the coefficient of basic charge is set to "0.8" so as to decrease a charge for the pay information. Further, stored in the terminal decrypting portions 34 in the terminals 3A and 3B are a terminal decryption keys "K'a" and "K'b" corresponding to the terminal encryption keys "Ka" and "Kb", respectively. Now, operation of the present pay information providing system from the time when a user inputs a request to the time the user obtains pay information will be described referring to the drawings. In the following description of operation, specifically as to operation of the terminal managing portion 25, description will be made referring to a flow chart shown in FIG. 8.

For example, when a user of the terminal 3A wants to use pay information (a title "P") provided by an information provider "X", the command generation portion 31 generates a request according to an input by the user and outputs the request to the terminal I/F 32. The request includes the identifier "A" of the terminal 3A, the title "P" and the date/time information "T1" indicating the date/time when the request is generated, and is inputted via the terminal I/F 32, the local bus 5 and the server I/F 24 to a coefficient of charge calculating portion 255 in the terminal managing portion 25. The terminal managing portion 25, which has been in the request wait state ((step S71), i.e., if "Request Received is No, then step S71 is repeated), thereby executes a processing for obtaining a coefficient of charge, (i.e., if "Request Received" is Yes, then processing proceeds to step S72). First, the coefficient of charge calculating portion 255 extracts and holds the coefficient of basic charge "1.5" corresponding to the identifier "A" included in the inputted request from the terminal information storing portion 252 (step S72).

Next, the coefficient of charge calculating portion 255 searches in the request content storing portion 253, and counts and holds the aggregate number of the terminals 3 which used the pay information with the title "P" prior to the data/time information "T1" included in this request (step S73). At this moment, assume that the aggregate number is "0" (refer to FIG. 6). Next, the coefficient of charge calculating portion 255 extracts a discount rate corresponding to the held aggregate number from the discount information storing portion 254 (step S74). At this moment, a discount rate "0%" corresponding to the aggregate number "0" is extracted (refer to FIG. 7). Next, the coefficient of charge calculating portion 255 calculates the coefficient of charge "1.5" based on the held coefficient of basic charge "1.5" and the discount rate "0%", and outputs the calculated coefficient of charge "1.5" and the title "P" to the second charge managing portion 223 (step S75). Then, the coefficient of charge calculating portion 255 stores the identifier "A" of the terminal 3, the title "P" and the date/time information "T1" in the request content storing portion 253 and outputs the request to the internal scrambler 256. The processing in the second charge managing portion 223 will be described later.

When the request is inputted, the internal scrambler setting portion 256 generates an internal scramble key and sets the internal scramble key to the internal scrambler (step S76). The internal scrambler setting portion 256 then extracts the terminal encryption key "Ka" of the terminal 3A from the terminal information storing portion 252, and encrypts the internal scramble key with the extracted terminal encryption key "Ka" and outputs the result to the server I/F 24 (step S77). Next, the internal scrambler setting portion 256 outputs the inputted request to the request transmitting portion 257.

The above encrypted internal scramble key (which is encrypted with the terminal encryption key "Ka") is inputted via the server I/F 24, the local bus 5 and the terminal I/F 32 of the terminal 3A to the terminal decrypting portion 34 of the terminal 3A. The terminal decrypting portion 34 of the terminal 3A decrypts the encrypted internal scramble key with the terminal decryption key "K'a" stored in its internal memory to obtain the original internal scramble key. Next, the terminal decrypting portion 34 sets the above internal scramble key to the internal descrambler 33 and waits for the pay information to be transmitted.

The request transmitting portion 257 transmits the inputted request to the transmitting station TS managed by the information provider "X" (step S78). The terminal managing portion 25 thereby completes the processing for obtaining the coefficient of charge, the setting processing of the internal scrambler and the request transmitting processing, and goes on to the request wait state again, capable of receiving requests from other terminals 3.

Next, operation of the transmitting station TS which the information provider "X" manages will now be described. On receiving a request transmitted from the request transmitting portion 257, the transmitting station TS generates related information. The related information includes a table bearing basic charges corresponding to each of the pay information which the information provider "X" provides (hereinafter referred to as basic charge information) and the contract information previously registered. Next, the scramble key generating portion 11 generates a scramble key and sets the scramble key to the scrambler 12. Further, the scramble key generating portion 11 outputs the scramble key to the related information encrypting portion 13.

The related information encrypting portion 13 encrypts the inputted related information and scramble key with the server encryption key of the server 2 which transmitted the request, and outputs the encrypted related information, etc. to the multiplex/transmitting portion 14. On the other hand, the scrambler 12 scrambles the pay information to be transmitted with the previously set scramble key, and outputs the result to the multiplex/transmitting portion 14. The multiplex/transmitting portion 14 multiplexes the encrypted related information and scramble key and the scrambled pay information, and transmits the result as a multiplex signal using the transmission path 4, as described above.

Next, operation of the server 2 will now be described. In the server 2, the receiving portion 211 in the receiving device 21, corresponding to the transmitting station TS which the information provider "X" manages, receives multiplex signals transmitted through the transmission path 4. The receiving portion 211 demultiplexes the received multiplex signals into the encrypted related information and scramble key and the scrambled pay information. The receiving portion 211 outputs the encrypted related information, etc. to the related information decrypting portion 221 of the IC card 22, and outputs the scrambled pay information to the descrambler 212.

The related information decrypting portion 221 decrypts the encrypted related information and scramble key using the server decryption key previously stored, and then outputs the decrypted contract information (which is included in the related information) and scramble key to the qualification judging portion 222, and outputs the decrypted basic charge information (which is included in the related information) to the second charge managing portion 223. Here, a processing at the qualification judging portion 222 will be described. The qualification judging portion 222 examines the decrypted contract information to judge whether the receiving device 21 has qualifications for receiving the pay information or not, and outputs the scramble key inputted together with the contract information to the descrambler 212 only when the receiving device 21 has qualification. The descrambler 212 is thereby set with the scramble key, capable of descrambling the scrambled pay information.

The descrambler 212 descrambles the scrambled pay information using the set scramble key and outputs the descrambled pay information to the internal scrambler 23. As described above, set to the internal scrambler 23 is the internal scramble key by the internal scrambler setting portion 256 (refer to step S76 in FIG. 8). The internal scrambler 23 scrambles the inputted pay information using the internal scramble key. The pay information scrambled with the internal scramble key is outputted from the internal scrambler 23, and inputted via the server I/F 24, the local bus 5 and the terminal I/F 32 of the terminal 3A to the internal descrambler 33 of the terminal 3A.

Next, operation of the terminal 3 will now be described. The internal descrambler 33 of the terminal 3A descrambles the inputted pay information using the previously set internal scramble key. The internal descrambler 33 outputs the descrambled pay information to the picture/audio decoder 35. The picture/audio decoder 35 decodes the inputted pay information and outputs the result to the picture/audio outputting portion 36. The picture/audio outputting portion 36 outputs the decoded pay information. The user thereby uses the pay information with the title "P" through the terminal 3A.

Next, operation of the second charge managing portion 223 in the IC card 22 will now be described. Inputted to the second charge managing portion 223, as described above, are the coefficient of charge calculated by the coefficient of charge calculating portion 255 of the terminal managing portion 25 and the like (refer to step S76 in FIG. 8), and further the basic charge information of the pay information which the information provider "X" provides. In the basic charge information, the basic charge for the pay information with the title "P" is also stored. Assume that the basic charge for the pay information with the title "P" is "P'". The second charge managing portion 223 multiplies the basic charge "P'" by the coefficient of charge "1.5" to obtain the charge for the pay information with the title "P"" 1.5×P'", and stores the result in its internal memory (refer to FIG. 9 (a)).

Next, operation will now be described when a request from the terminal 3B is transmitted to the terminal managing portion 25 which has been in the request wait state. The terminal 3B also generates a request in the same procedure as that of the terminal 3A. The request includes the identifier "B" of the terminal 3B, the title "P" and data/time information "T2" (which is time later than "T1") indicating the date/time when the request is generated, and, similarly as described, is inputted to the coefficient charge calculating portion 255. The terminal managing portion 25 in the request wait state (step S71) thereby goes on to the processings at step S72. First, the coefficient of charge calculating portion 255 executes the same processing as described above. This time, the coefficient of charge calculating portion 255 extracts and holds the coefficient of basic charge "0.8" (step S72). Next, the coefficient of charge calculating portion 255 counts the aggregate number of the terminals 3 to which the pay information with the title "P" is transmitted prior to the date/time information "T2" (step S73). This time, the aggregate number of the terminals is "1" (refer to FIG. 6). The coefficient of charge calculating portion 255 holds the aggregate number of the terminals "1". Next, the coefficient of charge calculating portion 255 extracts the discount rate "5%" corresponding to the aggregate number of the terminals "1" from the discount information storing portion 254 (step S74, refer to FIG. 7). Next, the coefficient of charge calculating portion 255 calculates a coefficient of charge "0.76" (=0.8×(1−0.05)) based on the held coefficient of basic charge "0.8" and discount rate "5%", and outputs the calculated coefficient of charge "0.76" and the title "P" included in the request to the second charge managing portion 223 (step S75). The coefficient of charge calculating portion 255 then stores the contents of the request in the request content storing portion 253 (refer to FIG. 6), and outputs the request to the internal scrambler setting portion 256.

Based on the identifier and the title which are included in the inputted request, the internal scrambler setting portion 256 encrypts the internal scramble key generated in response to the above request from the terminal 3A with the terminal encryption key "Kb" of the terminal 3B extracted from the terminal information storing portion 252. The internal scrambler setting portion 256 outputs the encrypted internal scramble key to the server I/F 24. The internal scrambler setting portion 256 then outputs the request to the request transmitting portion 257.

The encrypted internal scramble key (which is encrypted with the terminal encryption key "Kb") is inputted via the server I/F 24, the local bus 5 and the terminal I/F 32 of the terminal 3B to the terminal decrypting portion 34 of the terminal 3B in the same manner as described in the above case of the terminal 3A. The terminal decrypting portion 34 of the terminal 3B decrypts the encrypted internal scramble key with the terminal decryption key "K'b" stored in its internal memory to obtain the internal scramble key. The above terminal decrypting portion 34 sets the internal scramble key to the internal descrambler 33. The terminal 3B then waits for the pay information to be transmitted. As described above, picture information/audio information as to the title "P" has already been outputted from the server I/F 24 to the terminal 3A. At this time, when obtaining the internal scramble key, the terminal 3B executes the same processing as that of the terminal 3A, allowing the user to use the pay information with the title "P" via the terminal 3B.

On the other hand, the second charge managing portion 223 of the IC card 22 executes the same processing as described above, while this time multiplying the coefficient of charge "0.76" calculated by the coefficient charge calculating portion 255 by the basic charge "P'", and storing "0.76×P'" in its inner memory as a charge for the pay information with the title "P" (refer to FIG. 9B). Therefore, at this time, the memory in the second charge managing portion 223 stores "1.5×P'+0.76×P'" as a total of charges for billing the household where the server 2 is installed.

According to an instruction by the user, each terminal 3 thereafter requests the transmitting station TS of the information provider with whom the user made a contract to provide pay information, and the transmitting station TS of the information provider transmits the pay information in response to the request. The second charge managing portion 223 in the IC card 22 of the receiving device 21 corresponding to each transmitting station TS obtains and accumulates charges for using the pay information by the above request based on the coefficient of charge and the basic charge. The amount of charges of the pay information can thereby be obtained. Then, the second charge managing portion 223 transmits the amount of charges to the first charge managing portion 15 of the transmitting station TS at prescribed timing (for example, timing per month). Each information provider thereby obtains the amount of charges for each household.

In the above second embodiment, it is not preferred that the user can easily manipulate each of the information stored in each of the second charge managing portion 223 and the terminal managing portion 25 because the information belongs to the information provider. Therefore, the second charge managing portion 223 preferably stores the information in a secure field in the IC card and the like so as not to allow tampering by the user. Also, the terminal information storing portion 252 preferably stores the information in a secure field, while the contents of the terminal information which the terminal information storing portion 252 stores has to be changed as the installation situations (the number of installation, installation place, etc.) of the terminal 3 in the receiving station RS change. Therefore, initialization is again required. In this case, only an authorized person (for example, a person dispatched from the information provider) can manipulate the terminal for initialization. The credibility of the information stored in the second charge managing portion 223 and the like is thereby maintained.

In the second embodiment, the server 2 obtains a charge for use of the pay information every time a request from each terminal 3 installed in the receiving station RS to which the server 2 belongs is inputted. Therefore, the information provider can charge the amount of actual use of the pay information by the user at each receiving station RS. As a result, it can be avoided to occur unfairness as to the charged amount between a receiving station in which many terminals 3 are connected to the server 2 (that is, a receiving station capable of transmitting the same program to a plurality of the terminal 3) and a receiving station otherwise. Moreover, in the pay information providing system of the present embodiment, the charge for use of the pay information is determined on the basis of the coefficient of basic charge and the discount information, not simply by setting the charge obtained by multiplying the basic charge for the pay information by the number of requests to the charged amount for the receiving station RS. This enables adaptation of a charge system acceptable even at the receiving station RS in which many of the terminals 3 are connected to the server 2.

The discount rates in response to the number of requests are not restricted to those shown in FIG. 7, but arbitrarily defined according to the intentions by the information providers. Therefore, when the information providers "X" and "Y" adopt different discount rates, tables for the discount rates or the discounted amounts corresponding to respective information providers are stored in the discount information storing portion 254 for selective use.

In the second embodiment, the pay information transmitted from each transmitting stations TS is received as a totality and distributed to the terminal which sent the request. Therefore, even when a plurality of the terminals 3 are installed in one receiving station RS, it is not required to install the receiving device 21 and the IC card 22 corresponding to each terminal 3. That is, according to the second embodiment, if comprising one receiving device 21 for a broadcast satellite, for example, the server 2 can distribute the pay information from the broadcast satellite to the plurality of the terminals 3. As a result, the amount of the initial investment from the contractor is reduced. More specifically, assume that a cost of the receiving device 21 and the IC card 22 installed in the server 2 is $\alpha$, a cost of the terminal managing portion 25 and the internal scrambler 23 is $\beta$, a cost of the terminal 3 is $\gamma$, and the number of the terminals 3 connected to the server 2 is n. In this case, in the pay information providing system according to the present embodiment, a cost for the receiving station RS is $\alpha+\beta+\gamma\times n$. On the other hand, in a system configuration where the receiving device 21 and the IC card are provided for each terminal, a cost for the receiving station RS is $(\alpha+\gamma)\times n$. Therefore, when $\beta<\alpha$ and $n\geq 2$, the initial investment for the pay information providing system of the present embodiment is sufficiently small.

In the second embodiment, the coefficient of basic charge is obtained based on the attributes of the terminal 3. For example, when the terminal 2 is installed in a living room or the size of the screen is large, it is assumed that the pay information is used by many members of the household, which makes the coefficient of basic charge large. On the other hand, when the terminal 3 is installed in a private room or the size of the screen is small, it is assumed that the pay information is used by an individual, which makes the coefficient of basic charge small. This allows billing in detail in response to the attributes of the terminal 3. In the present embodiment, the installation place and the screen size are used as the terminal information, while the terminal information is not restricted to these but has characteristics which can be determined at the information provider's discretion. Therefore, for example, it is possible to use information indicating whether the terminal 3 is a portable model or a stay-at-home model, operability of the terminal 3 and display resolution of the terminal 3 and the like as the terminal information.

In the second embodiment, the system capable of discounting a charge for the pay information according to the aggregate number of the terminals which used the same pay information has been described. However, the system is not restricted to the above, discount information shown in the following 1 to 3 can be stored in the discount information storing portion 254.

1. Discount according to whether commercials are included in the pay information The information provider previously sets to the discount information storing portion 254 a discount rate (or a discount amount) according to whether commercials are included in the pay information. When making a contract with the user as to providing pay information, the information provider also makes the user select whether to make commercials included in the pay information to be provided. Furthermore, the information provider makes description that the pay information selected by the user is transmitted included in the above mentioned contract information, and registers the contract information. On receiving a request from the request transmitting portion 257, the transmitting station TS transmits the pay information based on the contract information. The coefficient of charge calculating portion 255 then obtains the coefficient of charge referring also to the discount rate according to whether commercials are included or not and the like. In this way, the pay information provider can differentiate between the charge for the pay information to the contractor which is provided with the pay information including commercials and the charge to the contractor otherwise. This allows construction of the pay information providing system having a wider range of charge system.

2. Discount according to attributes of a user

In the second embodiment, although the terminal information storing portion 252 only stores the terminal information as to the attributes of the terminal 3, it can also store user information as to attributes of a user who operates the terminal 3 and make charges of the used pay information different according to users. For example, when a child, a member of a specific group or the like uses pay information, the terminal information storing portion 252 stores, in addition to the coefficients of basic charge shown in FIG. 5, a coefficient of basic charge and an ID number corresponding thereto of the child (or a coefficient of basic charge and an ID number corresponding thereto of the member). When a request including the above ID number is inputted, the coefficient of charge calculating portion 255 obtains a coefficient of charge referring to the coefficient of basic charge for the child (or the coefficient of basic charge for the member). The second charge managing portion 223 obtains the charge for the pay information based on the coefficient of charge obtained by the coefficient of charge calculating portion 255 to differentiate the charges according to the attributes of the users. Examples of the attributes of the user are the user's age, sex, occupation or the like, and on the basis of these, the information provider may be at liberty to set the coefficient of basic charge.

Further, in connection with discount according to the attributes of the user, if the assigned coefficient of basic charge (refer to FIG. 5) based on the terminal information of the terminal 3 is not stored and only the coefficient of basic charge for the child and the corresponding ID number are stored, the terminal 3 can be used only by the child. That is, when the coefficient of basic charge based on attributes of the user and the ID number corresponding thereto are set to each family member, it is possible to construct a high personal-oriented pay information providing system.

3. Discount by providing terminal information and user information for the information provider In terms of marketing research, etc., it is an important matter for the information provider to know through which terminal and by which user the information provided from the information provider is used. However, the attributes of the terminal 3 provided in the receiving station RS and the attributes of the user who uses the receiving station RS relate to the contractor's privacy, and the contractor does not want them to be leaked outside. Therefore, in compensation for being provided with the terminal information and the user information provided by the user, the information provider previously sets a discount rate or a discount amount for discounting the charge of the pay information to be provided to the discount information storing portion 254. When requesting the pay information, the user determines whether to provide the terminal information of the terminal 3 now in use and his/her own user information for the information provider. When the user determines to provide the terminal information now in use and his/her own user information, the coefficient of charge calculating portion 255 obtains a coefficient of charge of the requested pay information also referring to the discount information. Further, when the request includes the terminal information of the terminal and the user information which the user determined to provide and then is transmitted, the information provider can easily obtain this information. In this way, in compensation for being provided with the information as to through which terminal and by which user the provided pay information is used at the receiving station RS, etc., the information provider discounts the charge of the pay information. This allows harmony in interests between the information provider and the contractor, and construction of the pay information providing system having a wider range of charge system.

In the second embodiment, the request content storing portion 253, as described above, manages requests sent to the server 2, thereby storing schedules of use at the terminals 3. Therefore, if the contents in the request content storing portion 253 are displayed at any of the terminals 3, the user who operates the terminal 3 can easily know the use situations of the pay information at other terminals 3. In this way, if the use situation of other terminals 3 is managed, for example, parents can monitor what kind of pay information their children use. Further, contrary to the above, if the contents of the request are made to be not displayed, it is possible to keep secret the information regarding when and which of terminals 3 used which kind of pay information, thereby realizing protection of privacy as to use of the pay information.

In the second embodiment, the second charge managing portion 223 manages the basic charge information of the pay information provided by the information provider and the charged amount for the user. Therefore, if the basic charge information and the charged amount are made to be displayed in the terminal 3, the user can select the pay information for use referring to the basic charge information, and further can know beforehand the amount to be charged by the information provider. Furthermore, the terminal information storing portion 252 manages the terminal information of the terminals 3 connected to the server 2. Therefore, the terminal information is displayed at the terminal 3, the user can easily determine through which terminal to use the pay information for a lower charge. These features allow a more usable pay information providing system to be constructed.

In the second embodiment, a plurality of the transmitting stations TS exist, and the case in which the scramble method is different at each of the transmitting stations TS has been described. In this case, as described above, the server 2 performs descrambling at the descrambler 212 provided in response to each transmitting station TS, performs scrambling again at the internal scrambler 23, and then transmits the result to a prescribed terminal 3. However, when only one information provider makes the receive contract, or when the scramble methods are unified among each transmitting station TS despite a plurality of information providers, the structure of the server 2 can be simplified. That is, the internal scrambler 23 of the server 2 encrypts not the pay information descrambled by the descrambler 212 but the scramble key acquired by the related information decrypting portion 221 (generated at the scramble key generating portion 11) using each terminal encryption key, and transmits the result to each terminal 3. The server 2 then transmits the received pay information in the same state as generated at the transmitting station TS (that is, as scrambled at the scrambler 12) to the terminal 3. The terminal 3 can acquire the scramble key by decrypting the encrypted scramble key. Further, the terminal 3 descrambles the scrambled pay information using the scramble key. It is thereby possible to simplify the structure of the server 2 compared to that in the above described first embodiment and also decrease the processing load of the server 2. That is because, as compared to the amount of data of the pay information generated by the transmitting station TS, the amount of data of the scramble key is far smaller.

In the second embodiment, the server 2 manages the terminal encryption key which is unique to each terminal, and each of the terminals 3 manages the terminal decryption key which has no duplication. However, instead of such terminal encryption key, a so-called public encryption key may be used.

While the second embodiment has the structure in which the pay information transmitted from a broadcast satellite or the like is used in real time by the user with the terminal 3, a system may be constructed as such that a storage medium with a large capacity capable of writing and reading such as a DVD (Digital Video Disc) is installed in the server 2 and the transmitted pay information is temporarily stored in the storage medium. In this case, the user selects the desired pay information among the pay information stored in the storage medium. The terminal 3 transmits a request as to the pay information selected by the user. The server 2 transmits the pay information in response to the request to the terminal 3 which the user operates. In this case, set to the terminal information storing portion 252 may be a coefficient of basic charge (a second coefficient of basic charge) which is different from the coefficient of basic charge (a first coefficient of basic charge) for use in obtaining a charge for the pay information used in real time, and the coefficient of charge calculating portion 255 may obtain a charge for the pay information selected and used from the storage medium based on the set second coefficient of basic charge.

Third Embodiment

Figure 10:
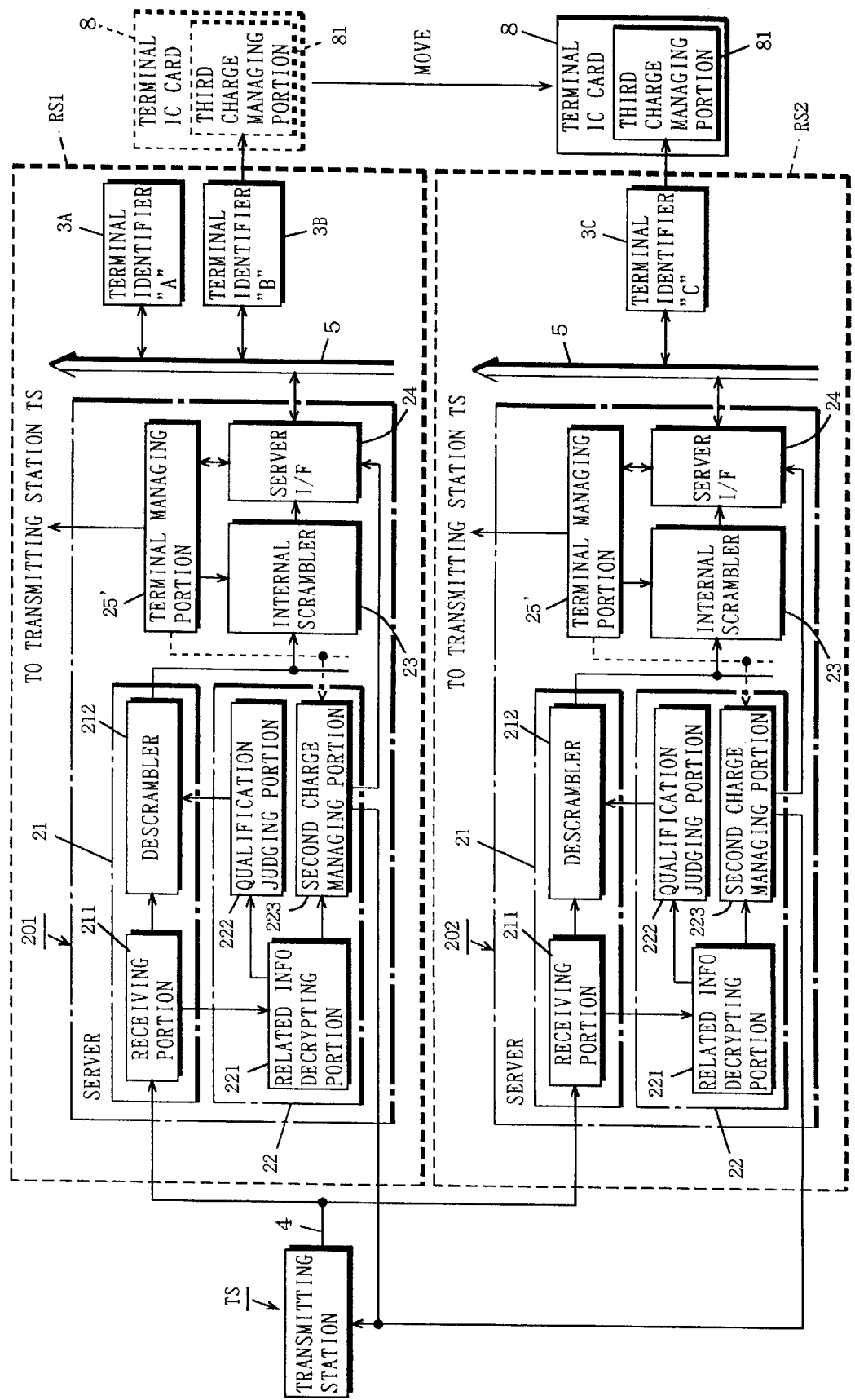
FIG. 10 is a block diagram showing the whole structure of a pay information providing system according to third and fourth embodiments of the present invention.

FIG. 10 is a block diagram showing the whole structure of the pay information providing system according to a third embodiment of the present invention. In FIG. 10, the pay information providing system of the present embodiment comprises a transmitting station TS, and receiving stations RS1 and RS2. In FIG. 10, while the system structure having one transmitting station and two receiving stations is shown for simplification of representation, the number of transmitting stations and receiving stations which the system includes may be more than the number shown in the representation.

The receiving station RS1 includes a server 201 and two terminals 3A and 3B. The receiving station RS2 includes a server 202 and one terminal 3C. Given to the two terminals 3A and 3B in the receiving station RS1 are identifiers "A" and "B", respectively. Given to the terminal 3C in the receiving station RS2 is an identifier "C".

In FIG. 10, since the transmitting station TS has the same structure as that of the transmitting station TS shown in FIG. 2, a representation of a detailed internal structure is omitted and the reference numbers used in FIG. 2 will be quoted in the following description. Compared to the server 2 shown in FIG. 2, the servers 201 and 202 shown in FIG. 10 are different only in the terminal managing portion 25', and other portions have the same structure as those of the server 2 shown in FIG. 2. Therefore, the same reference numbers are given to the corresponding portions and their description is omitted. To the terminal managing portion 25', in addition to the function which the terminal managing portion 25 shown in FIG. 2 has, a unique function to the present embodiment (will be described later) is added. Compared to the terminal 3 shown in FIG. 2, the terminals 3A to 3C are different in that a terminal IC card 8 can connect to the terminal I/F 32 and in that a unique function to the present embodiment (will be described later) is added, in addition to the function which the terminal 3 of the second embodiment has. Since other portions have the same structure as those of the terminal 3 shown in FIG. 2, the representation of a detailed internal structure is omitted and the reference numbers used in FIG. 2 will be quoted in the following description. The terminal IC card is structured in such a manner that it can connect to any of the terminals 3A to 3C, and is further provided with a third charge managing portion 81 therein.

Next, operation of the pay information providing system according to the third embodiment of the present invention will now be described. Here, as an example of characteristic operations of the present embodiment, an accounting method of pay information will be described in a case where a user who usually uses pay information at the receiving station RS1 goes to a place in which the receiving station RS2 is installed (for example, goes to one house to another), carrying the terminal IC card 8, and acquires the pay information through the terminal 3C in the receiving station RS2.

Now, connected to the terminal 3B in the receiving station RS1 is the terminal IC card 8. In such a state, the command generating portion 31 of the terminal 3B generates a request command for requesting the server 201 to give an electronic value based on an input from the user who manages the terminal IC card 8. Here, the electronic value is a money value capable of being settled electronically. This request command is inputted through the terminal I/F 32 of the terminal 3B, the local bus 5 and the server I/F 24 of the server 201 to an electronic value generating portion (not shown and which is provided for adding a function) provided in the terminal managing portion 25'. The electronic value generating portion notifies the second charge managing portion 223 to make a predetermined charge "V" when the request command is inputted. The second charge managing portion 223 stores the charge "V" in its internal memory in response to the notification. Therefore, the information provider can bill the contractor who manages the receiving station RS1 for an equivalent amount "V" of the electronic value in addition to the charge for use of the pay information shown in FIG. 9.

Further, the electronic value generating portion generates and outputs an electronic value equal to the amount "V" to the server I/F 24. The electronic value is inputted through the server I/F 24, the local bus 5 and the terminal I/F 32 of the terminal 3B to the third charge managing portion 81 of the terminal IC card 8 set to the terminal 3B. The third charge managing portion 81 stores the inputted electronic value in its internal memory (not shown). The terminal IC card 8 is thereby given the electronic value equivalent of the amount "V".

The user carrying the above terminal IC card 8 goes to a place where the server 202 is installed and sets the terminal IC card 8 to the terminal 3C. The command generating portion 31 of the terminal 3C generates a request for the pay information according to the input by the user. At this time, the command generating portion 31 determines whether an electronic value is stored in the connected terminal IC card 8 or not, and generates a request only when an electronic value is stored. In this request, a request for transmitting the charge for use of the pay information to the terminal 3C (hereinafter referred to as a charge transmission request) is included. The request is, as is the same described in the second embodiment, inputted to the coefficient of charge calculating portion 255. The coefficient of charge calculating portion 255 obtains a coefficient of charge based on the terminal information of the terminal 3C. The coefficient of charge calculating portion 255 outputs the obtained coefficient of charge and the charge transmission request included in the inputted request, etc., to the second charge managing portion 223 (operation in the second charge managing portion 223 will be described later). The coefficient of charge calculating portion 255 then outputs the request to the internal scrambler setting portion 256. Since the following processings are the same as described in the second embodiment, description is omitted.

The transmitting station TS also executes the same processings as described in the above mentioned second embodiment. At this time, the related information encrypting portion 13 encrypts the related information and the scramble key by the server encryption key of the server 202. The multiplex/transmitting portion 14 then outputs a multiplex signal to the transmission path 4, as described above. Since the following operation of the server 202 and the terminal 3C regarding transmission of the pay information is the same as described in the second embodiment, detailed description is omitted.

Next, operation of the second charge managing portion 223 in the IC card 22 provided in the server 202 will be described. To the second charge managing portion 223, as described above, the coefficient of charge calculated by the coefficient of charge calculating portion 255 of the terminal managing portion 25' and the like are inputted. Further, to the second charge managing portion 223, as is the same described in the second embodiment, the basic charge information of the pay information transmitted from the transmitting station TS is inputted. The second charge managing portion 223 obtains a charge for use of the pay information based on the inputted coefficient of charge and the basic charge for the requested pay information. Assume that the obtained charge of the pay information is taken as "W". At this time, the second charge managing portion 223, with the charge transmission request inputted, generates charge information for notifying the terminal 3C of the obtained charge of the pay information "W" and outputs the charge information to the server I/F 24. The charge information is inputted from the server I/F 24 through the local bus 5 and the terminal I/F 32 of the terminal 3C to the third charge managing portion 81 of the terminal IC card 8.

The third charge managing portion 81, when the above charge information is inputted, updates the held electronic value to "V"-"W" based on the electronic value equivalent to the amount "V" currently stored in its internal memory and the charge "W" of the pay information included in the charge information. The user has thereby paid the charge for the pay information acquired through the terminal 3C. Similarly, in the following, when the charge for the pay information used by the user through the terminal 3C which is connected to the server 2 other than the server 201 is inputted, the third charge managing portion 81 updates the balance of the given electronic values based on the electronic values stored at that time and the charge for the pay information included in the charge information.

In the above third embodiment, to allow use of the pay information at other receiving stations, the electronic value is added to the terminal IC card 8. However, in some cases, the user desires to reimburse without using the electronic value (the entire amount initially given or the balance after use) given to the terminal IC card 8. To respond these needs, the second charge managing portion 223 at each receiving station preferably has a function for reimbursing the electronic value given to the terminal IC card 8.

Fourth Embodiment

Next, the pay information providing system according to a fourth embodiment of the present invention will be described. Since the structure of the pay information providing system according to the fourth embodiment is the same as the structure of the third embodiment shown in FIG. 10, only points of difference from the third embodiment will be described below.

In the above described third embodiment, the terminal managing portion 25' in the server has the electronic value generating portion, while in the fourth embodiment, the terminal managing portion 25' includes a credit information generating portion (not shown) instead of the electronic value generating portion. Further, in the fourth embodiment, processings at the second charge managing portion 223 is different from those in the third embodiment. Further, in the fourth embodiment, processings at the third charge managing portion 81 in the terminal IC card 8 is different form those in the third embodiment.

Next, operation of the pay information providing system according to the fourth embodiment will now be described. Here, as an example of characteristic operations of the present embodiment, an accounting method of pay information will be described in a case where a user who usually uses pay information at the receiving station RS1 goes to a place in which the receiving station RS2 is installed (for example, goes to one house to another), carrying the terminal IC card 8, and acquires the pay information through the terminal 3C in the receiving station RS2.

Now, connected to the terminal 3B in the receiving station RS1 is the terminal IC card 8. In such a state, the command generating portion 31 of the terminal 3B generates a request command for requesting the server 201 to give credit information according to an input from the user who manages the terminal IC card 8. Here, the credit information is information for giving credit of a predetermined amount to the terminal IC card 8. The request command is inputted through the terminal I/F 32 of the terminal 3B, the local bus 5 and the server I/F 24 of the server 201 to a credit information generating portion (not shown) in the terminal managing portion 25'. When the above request command is inputted, the credit information generating portion generates and outputs credit information to the server I/F 24. This credit information is inputted through the server I/F 24, the local bus 5 and the terminal I/F 32 of the terminal 3B to the third charge managing portion 81 of the terminal IC card 8 set to the terminal 3B. The third charge managing portion 81 stores the inputted credit information in its internal memory. The terminal IC card 8 is thereby given credit by the server 201, and the user carrying the terminal IC card 8 can use the pay information through the terminal 3C connected to the server 202.

The user carrying the above terminal IC card 8 goes to a place where the receiving station RS2 is installed and sets the terminal IC card 8 to the terminal 3C. The command generating portion 31 of the terminal 3C generates a request for the pay information according to the input by the user. At this time, the command generating portion 31 determines whether credit information is stored in the connected terminal IC card 8 or not, and generates a request only when credit information is stored. In this request, a request for transmitting the charge for use of the pay information to the terminal 3C (hereinafter referred to as a charge transmission request) is included. The request is, as is the same described in the second embodiment, inputted to the coefficient of charge calculating portion 255. The coefficient of charge calculating portion 255 obtains a coefficient of charge based on the terminal information of the terminal 3C. The coefficient of charge calculating portion 255 outputs the obtained coefficient of charge and the charge transmission request included in the inputted request, etc., to the second charge managing portion 223 (operation in the second charge managing portion 223 will be described later). The coefficient of charge calculating portion 255 then outputs the request to the internal scrambler setting portion 256. Since the following processings are the same as described in the second embodiment, description is omitted.

The transmitting station TS also executes the same processing as described in the above mentioned second embodiment. At this time, the related information encrypting portion 13 encrypts the related information and the scramble key by a server encryption key of the server 202. The multiplex/transmitting portion 14 then outputs a multiplex signal to the transmission path 4, as described above. Since the following operation of the server 202 and the terminal 3C regarding transmission of the pay information is the same as described in the second embodiment, detailed description is omitted.

Next, operation of the second charge managing portion 223 in the IC card 22 provided in the server 202 will be described. To the second charge managing portion 223, as described above, the coefficient of charge calculated by the coefficient of charge calculating portion 255 of the terminal managing portion 25' and the like are inputted. Further, to the second charge managing portion 223, as is the same described in the second embodiment, the basic charge information of the pay information transmitted from the transmitting station TS is inputted. The second charge managing portion 223 obtains a charge for use of the pay information based on the inputted coefficient of charge and the basic charge for the requested pay information. Assume that the obtained charge for use of the pay information is taken as "W". At this time, the second charge managing portion 223, with the charge transmission request inputted, generates charge information for notifying the terminal 3C of the obtained charge for use of the pay information "W" and outputs the charge information to the server I/F 24. The charge information is inputted from the server I/F 24 through the local bus 5 and the terminal I/F 32 of the terminal 3C to the third charge managing portion 81 of the terminal IC card 8.

When the charge information equivalent of the charge for use of the pay information "W" is inputted, the third charge managing portion 81 stores the charge for use "W" in its internal memory as a charge for use of the pay information used by the above user. Similarly, in the following, the charges for use of the pay information are cumulatively stored in the internal memory of the third charge managing portion 81 every time the pay information is used at the receiving station other than the receiving station RS1.

As described above, the user who uses the pay information using the terminal IC card 8 at any of the other receiving stations (in this case, the receiving station RS2) sets the terminal IC card 8 to either of the terminals (in this case, the terminals 3A and 3B) in the receiving station (in this case, the receiving station RS1) to which the user belongs by the time determined by the contract with the information provider, etc. The command generating portion 31 of the terminal to which the terminal IC card 8 is set takes out the charge for use of the pay information stored in the third charge managing portion 81 according to an input by the user, generates a charge transmission command for transmitting the charge for use of the pay information to the second charge managing portion 223, and outputs the command to the terminal I/F 32. This charge transmission command is inputted through the terminal I/F 32, the local bus 5 and the server I/F 24 to the second charge managing portion 223. The second charge managing portion 223 stores the charge for use of the pay information included in the inputted charge transmission command in its internal memory. Further, when the charge for use of the pay information is taken out from the command generating portion 31, the third charge managing portion 81 clears the charge for use of the pay information to "0". These reimbursement processings allow the information provider to bill the user for an accurate charge for use.

The transmitting stations with which each of the receiving stations contracts do not necessarily coincide with each other. For example, when the user carrying the terminal IC card 8 can use the pay information from the transmitting station TS with which the receiving station RS2 makes a contact but the receiving station RS1 does not, the charge of the pay information cannot be reimbursed later. Therefore, it is necessary to prevent the user carrying the terminal IC card 8 from using the pay information from the above described transmitting station TS. For this reason, a first identification information is set to the terminal IC card 8 for respectively identifying all of the information providers with which the receiving station RS1 contracts. That is, the first identification information is to respectively identify all of the transmitting stations TS connected to the receiving station RS1. Further, a second identification information is set to the coefficient of charge calculating portion 255 in the terminal managing portion 25' at the receiving station RS2 for respectively identifying all of the transmitting stations with which the receiving station RS2 contracts. That is, the second identification information is to respectively identify all of the transmitting stations TS connected to the receiving station RS2.

The command generating portion 31, in a state that the above described first and second identification information are set, makes the credit information stored in the terminal IC card 8 and the whole first identification information be included in a request to be generated. The coefficient of charge calculating portion 255 compares the second identification information previously set with the first identification information included in the inputted request prior to calculating a coefficient of charge, and determines whether the pay information included in the request can be transmitted to a terminal to which the terminal IC card 8 is connected. That is, when the first and the second identification information coincide each other, the coefficient of charge calculating portion 255 determines that the pay information included in the request can be transmitted to the terminal to which the terminal IC card 8 is connected. In other words, the coefficient of the charge calculating portion 255 determines that the user carrying the terminal IC card 8 can make disbursement later at the server 201, and executes the processing for obtaining the coefficient of charge, etc. Conversely, when the first and second identification information do not coincide with each other, the coefficient of charge calculating portion 255 determines that the pay information included in the request cannot be transmitted to the terminal 3C to which the terminal IC card 8 is connected. That is, the coefficient of the charge calculating portion 255 determines that the user carrying the terminal IC card 8 cannot make disbursement at the server 201, and does not execute the processing for obtaining the coefficient of charge, etc. This prevents the user carrying the terminal IC card 8 from acquiring the pay information from the transmitting station TS which is connected to the server 202 but not to the server 201, thereby preventing the information provider from suffering disadvantages.

Although the second to fourth embodiments mentioned above are structured as a so called on-demand-type pay information providing system of demanding transmission of desired pay information from the receiving station to the transmitting station and transmitting the demanded pay information from the transmitting station to the receiving station, this structure may be substituted for a broadcasting-type system configuration in which the user selects necessary pay information among the pay information unidirectionally broadcasted by the information provider and the charge for use of the selected pay information is made. Further, in the second to fourth embodiments described above, the charge for use of the pay information is calculated when the server receives a request from a terminal, the calculation timing of the charge for use of the pay information is not restricted to this. For example, it may be when the server actually receives the pay information from the transmitting station, etc.

In the above third and fourth embodiments, although the terminal IC card 8 has been described as being connected to a terminal, the terminal IC card 8 is not restricted to this and may have a structure capable of being connected to a server. When the terminal IC card 8 has such structure capable of being connected to a server, it is necessary to have a structure in which the terminal which the user carrying the terminal IC card 8 currently uses and other terminals are clearly differentiated and the charge for use of the pay information which the user acquires is reliably stored in the terminal IC card 8.

Fifth Embodiment

Next, a fifth embodiment of the present invention will be now described. The fifth embodiment is structured as a system further embodying the first embodiment described above.

Figure 11:
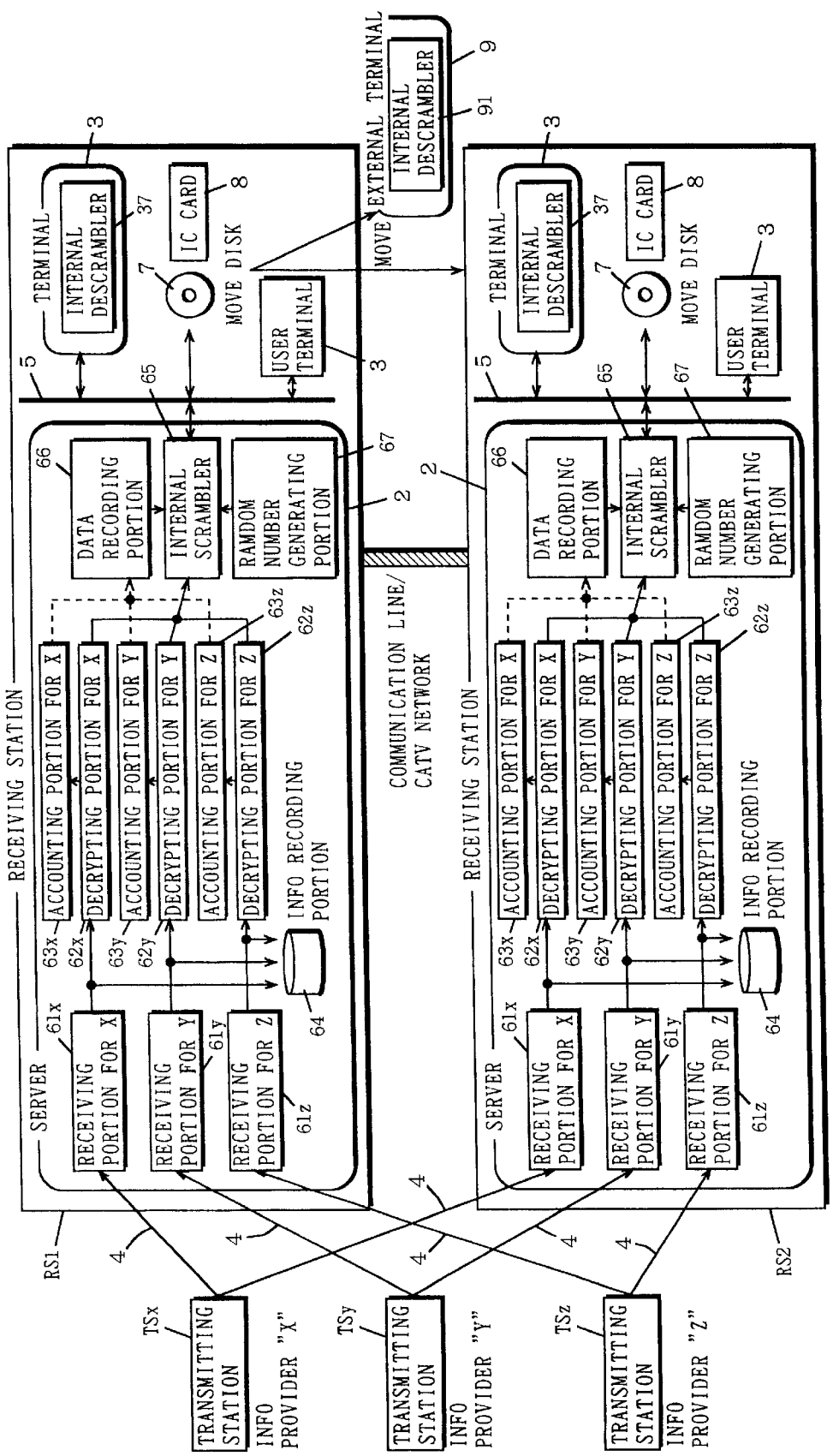
FIG. 11 is a block diagram showing the structure of a pay information providing system according to an embodiment of the present invention.

FIG. 11 is a block diagram shown the structure of a pay information providing system according to the fifth embodiment of the present invention. In FIG. 11, the pay information providing system of the present embodiment comprises three transmitting stations TSx, TSy, and TSz and two receiving stations RS1 and RS2. The transmitting stations TSx to TSz and the receiving stations RS1 and RS2 are connected through a transmission path 4 by wire or radio. Although in FIG. 11, the system structure having three transmitting stations and two receiving stations is shown for simplifying the representation, the number of the transmitting stations and the receiving stations which the system includes is not restricted to this.

The transmitting stations TSx to TSz are broadcast satellites, communication satellites, center stations of CATV, ground broadcast stations or the like which information providers manage, and transmit pay information such as picture/audio data, character data, and computer data. In the present embodiment, the transmitting station TSx is managed by an information provider "X", the transmitting station TSy is managed by an information provider "Y", and the transmitting station TSz is managed by an information provider "Z". Further, although each of the transmitting stations TSx to TSz has basically the same structure, each can separately determine and use a distributing method, a scramble method and an accounting method.

The receiving stations RS1 and RS2 include a server 2 and a plurality of terminals 3. The server 2 and the terminals 3 are connected through a local bus 5. The terminal 3 is a television set, a computer device or the like, which uses the pay information transmitted from the server 2 in a certain form (display, audio output, data processing, etc). The server 2 receives the pay information transmitted from the transmitting station which contracts with the server 2 and distributes the pay information to each terminal 3 in its own station. The sever 2 also manages use situations of the pay information at each terminal 3 in its own station based on a request from each terminal 3, and calculates a charge for use of the pay information at each terminal 3 from the use situations. Each receiving station is installed for each contractor (typically, a household or a business establishment) who makes a receive contract with the transmitting station. However, when a house complex such as a condominium is the receiving station, one server 2 may be provided for the whole house complex and the terminal 3 may be provided for each household.

The receiving station RS1 and the receiving station RS2 can perform bilateral communication of information through a communication line/a CATV network or through a hand-held storage medium. However, in the following, description will be made restricting to a case of communication of information through a hand-held storage medium.

As in the first to fourth embodiments, a user who belongs to each of the receiving stations RS1 and RS2 uses the pay information provided by the transmitting stations TSx to TSz through the terminal 3. The contractor who manages each of the receiving stations RS1 and RS2 periodically pays a charge for use to each of the transmitting stations TSx to TSz. However, the charge for use is calculated for each of the receiving stations RS1 and RS2 according to a degree of use of the pay information. Each of the transmitting stations TSx to TSz is notified of the calculated charge for use through a telephone line, a personal computer communication network, a digital CATV network, etc.

Each of the transmitting stations TSx to TSz scrambles the pay information to be provided and provides the scrambled pay information with an information identifier, accounting reference data and a record enable flag added for each of receiving stations RS1 and RS2. Here, the information identifier is to differentiate the provided pay information from other pay information, and also includes data indicating which of the transmitting stations TSx to TSz provides the pay information. The accounting reference data is data for calculating charge for use of the provided pay information, including data of charges for use in real time and charges for use by recording and the like. The record enable flag is a flag indicating whether the provided pay information can be recorded at the sides of the receiving stations RS1 and RS2 or not, and is defined as 1 when pay information can be recorded, and defined as 0 when it cannot be recorded.

Each of the receiving stations RS1 and RS2 further comprises a move disk 7 and an IC card 8 which are usable by any of the terminals 3. The move disk 7 is a hand-held storage medium capable of writing/reading, and the IC card 8 is a hand-held storage medium in which the recorded data is hard to analyze/change without authorization. The terminal 3 capable of using the move disk 7 and the IC card 8 can record information, data and the like received from the server 2 in the move disk 7 and the IC card 8. Moreover, the terminal 3 can read the information, the data and the like recorded in each of the move disk 7 and the IC card 8. Each terminal 3 can transmit an instruction such as a request inputted by the user to the server 2. An external terminal 9 has a stand-alone structure which is not connected online to any of the receiving stations, and can read the information, the data and the like recorded in each of the move disk 7 and the IC card 8.

The server 2 comprises a receiving portion for X 61x, a decrypting portion for X 62x, an accounting portion for X 63x, a receiving portion for Y 61y, a decrypting portion for Y 62y, an accounting portion for Y 63y, a receiving portion for Z 61z, a decrypting portion for Z 62z, an accounting portion for Z 63z, an information recording portion 64, an internal scrambler 65, a data recording portion 66 and a random number generating portion 67.

The receiving portion for X 61x receives the pay information distributed by the transmitting station TSx. The decrypting portion for X 62x descrambles the pay information received by the receiving portion for X 61x and the pay information provided by the transmitting station TSx among the pay information recorded in the information recording portion 64. The accounting portion for X 63x calculates a charge for use of the pay information based on the accounting reference data added to the pay information decrypted by the decrypting portion for X 62x. The accounting portion for X 63x also creates authorization data as required. The receiving portion for Y 61y receives the pay information distributed by the transmitting station TSy. The decrypting portion for Y 62y descrambles the pay information received by the receiving portion for Y 61y and the pay information provided by the transmitting station TSy among the pay information recorded in the information recording portion 64. The accounting portion for Y 63y calculates a charge for use of the pay information based on the accounting reference data added to the pay information decrypted by the decrypting portion for Y 62y. The accounting portion for Y 63y also creates authorization data as required.

The receiving portion for Z 61z receives the pay information distributed by the transmitting station TSz. The decrypting portion for Z 62z descrambles the pay information received by the receiving portion for Z 61z and the pay information provided by the transmitting station TSz among the pay information recorded in the in formation recording portion 64. The accounting portion for Z 63z calculates a charge for use of the pay information based on the accounting reference data added to the pay information decrypted by the decrypting portion for Z 62z. The accounting portion for Z 63z also creates authorization data as required.

Here, the authorization data is, when the external terminal 9 uses the pay information or when the pay information received by the receiving station RS1 is re-provided for the receiving station RS2 and the user of the receiving station RS2 uses the pay information at the terminal in his/her own station, to define the number of use of the pay information and a terminal capable of using the pay information, including the number of availability, a record mode and an accounting mode.

The above number of availability is the number of times that the pay information can be used, and is updated as pay information is used. The record mode is to limit the terminal capable of using the pay information, and is defined as 1 when the external terminal 9 uses the pay information and as 2 when the terminal 3 of the receiving station RS2 uses the pay information. The accounting mode is to indicate whether the pay information is charged information or not, and is defined as 1 when the pay information is charged and as 2 when not charged.

The information recording portion 64 records the pay information received by each of the receiving portions 61x to 61z. However, the information recording portion 64 has a function of determining whether the record enable flag added to the pay information to be recorded is 1 or not, and does not record the information whose record enable flag is not 1. The data recording portion 66 records a charge for use obtained by calculation by each of the accounting portions 63x to 63z. The data recording portion 66 also stores a secret key for each terminal 3. The random number generating portion 67 generates a random number.

The internal scrambler 65 rescrambles the pay information descrambled by each of the decrypting portion 62x to 62z with the random number generated by the random number generating portion 67. Further, the internal scrambler 65 encrypts the random number generated by the random number generating portion 67 with the secret key for each terminal 3 stored by the data recording portion 66. The accounting portions 63x to 63z and the data storing portion 66 are placed in a field where they cannot be analyzed, changed or duplicated.

The terminal 3 comprises an internal descrambler 37. The internal descrambler 37 holds a secret key unique to the terminal 3 and decrypts the encrypted random number transmitted from the server 2 with the secret key. Further, the internal descrambler 37 descrambles the rescrambled pay information transmitted from the server 2 in its own station with the decrypted random number. Furthermore, the internal descrambler 37 descrambles the rescrambled pay information transmitted from the server 2 of any of other receiving stations with the random number transmitted from the server 2 of the same receiving station. However, the internal descrambler 37 has a function of determining whether the authorization data transmitted from the server 2 of the one of other receiving stations satisfies prescribed conditions or not, and when the authorization data does not satisfy the conditions, the internal descrambler 37 does not perform the operation of descrambling the rescrambled pay information transmitted from the server 2 of the one of other receiving stations.

The external terminal 9 comprises an internal descrambler 91. The internal descrambler 91 descrambles the rescrambled pay information transmitted from the server 2 of any of the receiving stations with the random number transmitted from the server 2. However, the internal descrambler 91 has a function of determining the authorization data transmitted from the server 2 satisfies prescribed conditions or not, and when the authorization data does not satisfy the conditions, the internal descrambler 91 does not perform the operation of descrambling the rescrambled pay information.

Each operation of the present system will be described below in the following cases in which the pay information provided by the transmitting station TSx is received by the receiving station RS1 and;

(1) Used in real time;
(2) Recorded to be used;
(3) Used at the external terminal 9; and (4) Received by the receiving station RS1 and used by the receiving station RS2.

(1) Used in Real Time

Figure 12:
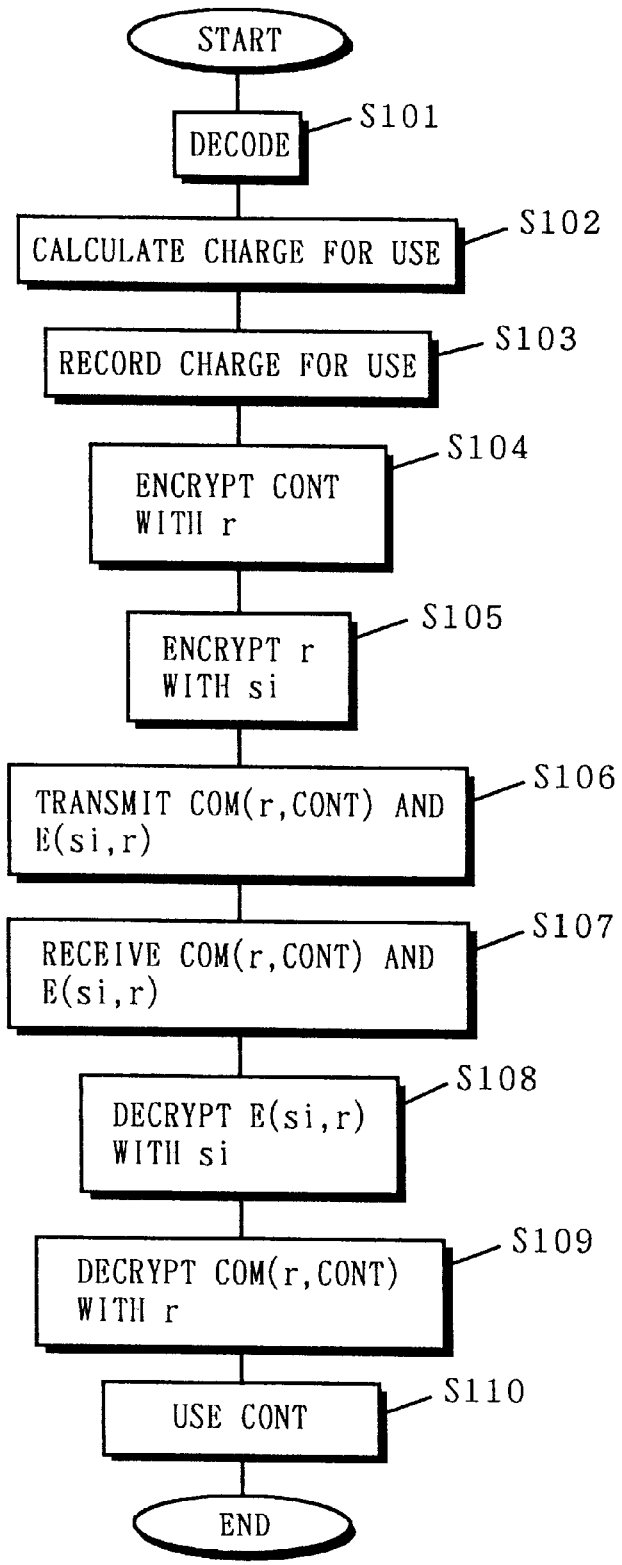
FIG. 12 is a flow chart showing operation of the system in FIG. 11 when pay information provided by a transmitting station TSx is received and used in real time by a receiving station RS1.

FIG. 12 is a flow chart showing operation of the system in FIG. 11 when the pay information provided by the transmitting station TSx is received by the receiving station RS and used in real time. Operation will be described below referring to FIG. 12 when the receiving station RS1 in FIG. 11 receives the pay information provided by the transmitting station TSx and a user of the receiving station RS1 uses the information in real time at the terminal 3.

First, the user of the receiving station RS1 inputs an intention of using certain pay information provided by the transmitting station TSx to the terminal 3. In response, the terminal 3 creates a request including the intention and notifies the server 2. The decrypting portion for X 62x which received the request descrambles the scrambled pay information received by the receiving portion for X 61x (step S101). The accounting portion for X 63x calculates a charge for use of the pay information based on the accounting reference data added to the pay information (step S102). However, the charge for use at that time is calculated based on a reference when the pay information is used in real time. The charge for use calculated by the accounting portion for X 63x is recorded in the data recording portion 66 (step S103). The charge for use recorded by the data recording portion 66 is regularly notified to each of the transmitting stations TSx to TSz through a telephone line, a personal computer communication network, a digital CATV network, etc. Therefore, the contractor who manages the receiving station RS1 pays the charge.

Next, the random number generating portion 67 generates a random number r, and the internal scrambler 65 rescrambles the pay information (CONT) descrambled by the decrypting portion for X 62x with the random number r according to an encrypting algorithm (COM) common to the present system (step S104). The internal scrambler 65 further encrypts according to a secret key encrypting algorithm (E) the random number r with a secret key si for each terminal 3 stored by the data recording portion 66 (step S105). The server 2 transmits the pay information COM(r, CONT) rescrambled by the internal scrambler 65 and the encrypted random number E(si, r) to the terminal 3 (step S106). Here, a(b,c) means that according to an algorithm a, with a key b, data c is scrambled or encrypted.

When the terminal 3 receives the rescrambled pay information COM(r, CONT) and the encrypted random number E(si, r) (step S107), the internal descrambler 37 of the terminal 3 initially decrypts the encrypted random number E(si, r) according to a secret key encrypting algorithm with a previously stored secret key si and extracts the random number r (step S108). Next, the internal descrambler 37 descrambles the rescrambled pay information COM(r, CONT) according to the decrypting algorithm common to the present system with the extracted random number r, and extracts the pay information (CONT) (step S109). The terminal 3 displays the pay information (CONT) descrambled by the internal descrambler 37. In this way, the user can use the pay information (CONT) (step S110).

As described above, the transmitting station TSx scrambles the pay information to be provided and adds accounting reference data for calculating a charge of the pay information to the receiving station. Provided for the receiving station RS1 are the server 2 and one or more terminals 3, and the receiving portion for X 61x of the server 2 receives the pay information provided by the transmitting station TSx. The accounting portion for X 63x calculates a charge for use of the pay information based on the accounting reference data which is added to the pay information when the pay information descrambled by the decrypting portion for X 62x is transmitted to the terminal 3. The data recording portion 66 records the charge for use calculated by the accounting portion for X 63x. The recorded charge for use is notified to the transmitting station TSx in a prescribed manner, and the manager (contractor) managing the receiving station RS1 will pay the charge later. Charging can thereby be made in response to a degree of use when the receiving station RS1 uses the pay information in real time.

Further, the internal scrambler 65 rescrambles the pay information descrambled by the decrypting portion for X 61x with the random number generated by the random number generating portion 67, and further encrypts the random number with the secret key for each terminal 3 stored in the data recording portion 66. When the redescrambled pay information and the encrypted random number are transmitted to the terminal 3, the internal descrambler 37 decrypts the encrypted random number with its own secret key, and further descrambles the rescrambled pay information with the decrypted random number. This makes it possible to safely transmit the pay information from the server 2 to the terminal 3.

The internal scrambler 65 may rescramble the pay information descrambled by the decrypting portion for X 61x with the secret key for each terminal 3 recorded by the data recording portion 66, and the internal descrambler 37 may descrambled the rescrambled pay information with its own secret key. However, in this case, since the pay information is scrambled with the same key every time, security at the time of transmission is lowered compared to a case where scrambling is performed with the random number.

(2) Recorded to be Used

Figure 13:
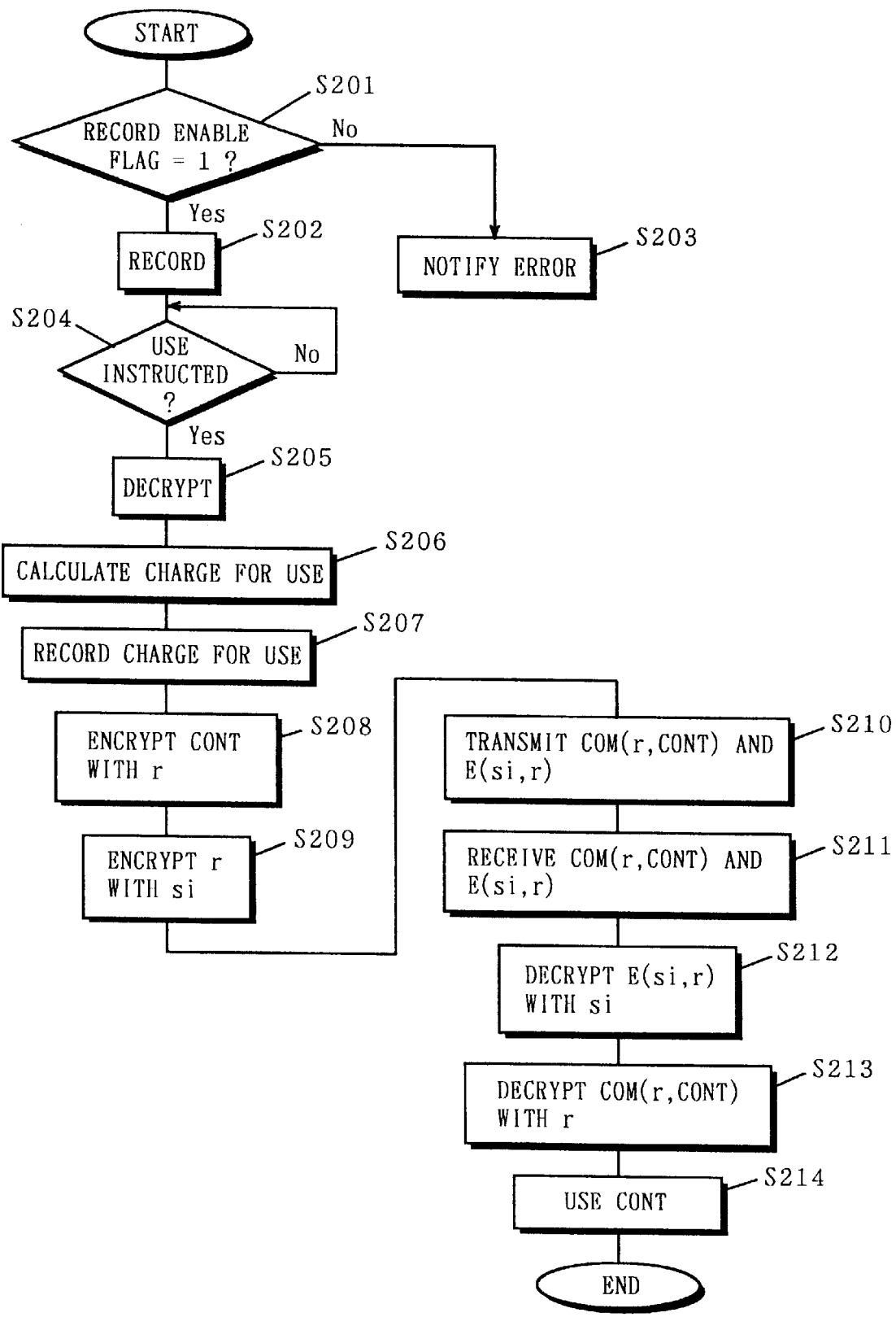
FIG. 13 is a flow chart showing operation of the system in FIG. 11 when pay information provided by the transmitting station TSx is received and recorded by the receiving station RS1 and the recorded information is used afterward.

FIG. 13 is a flow chart showing operation of the system of FIG. 11 in a case where the pay information provided by the transmitting station TSx is received and temporarily recorded, and the recorded pay information is used later. Operation when the receiving station RS1 receives and records the pay information provided from the transmitting station TSx and the recorded pay information is used later by a user of the receiving station RS1 will be described below referring to FIG. 13.

First, the user of the receiving station RS1 inputs an intention of recording certain pay information provided by the transmitting station TSx to the terminal 3. In response, the terminal 3 creates a request including the intention and notifies the server 2. The information recording portion 64 of the server 2 which received the request determines whether a record enable flag added to the pay information received by the receiving portion for X 61x is 1 or not, that is whether the pay information is enabled to be recorded (step S201).

When the record enable flag added to the pay information is 1, that is, when the pay information is enabled to be recorded, the information recording portion 64 records the information (step S202). Conversely, when the record enable flag added to the pay information is not 1, that is, when the pay information is not enabled to be recorded, the information recording portion 64 does not record the information and the terminal 3 displays occurrence of an error (step S203).

After that, when the user of the receiving station RS1 inputs an intention of using certain pay information recorded in the information recording portion 64 ((step S204), i.e., if "Use Instructed" is No, then step S204 is repeated, and if Yes, then processing proceeds to step S205), the server 2 retrieves the information the user desires among the pay information recorded in the information recording portion 64 by referring to an information identifier added to each pay information. Then, the server 2 recognizes that the retrieved pay information is provided from the transmitting station TSx and inputs the pay information to the decrypting portion for X 62x. The decrypting portion for X 62x descrambles the inputted information (step S205).

Next, the accounting portion for X 63x calculates a charge for use of the pay information based on accounting reference data added to the pay information (step S206). However, the charge for use at this time is calculated based on a reference in a case of recording and using the pay information. Then, the data recording portion 66 records the pay information calculated by the accounting portion for X 63x (step S207).

After that, as in the case of using in real time described in the above (1), e.g., as discussed above with respect to steps S104 to S110, the server 2 rescrambles the pay information and transmits the result to the terminal 3, and the terminal 3 receives and descrambles the rescrambled pay information transmitted from the server 2 (step S208 to step 211). This allows the user to use the pay information recorded in the information recording portion 64 at any desired time (step S214).

As described above, the transmitting station TSx provides the pay information with the record enable flag added. When the record enable flag added to the pay information received by the receiving portion for X 61x is 1 which indicates recording is allowed, the information recording portion 64 can record the pay information. The accounting portion for X 63x calculates a charge for use of the pay information based on the accounting reference data added to the pay information every time the pay information recorded in the information recording portion 64 is transmitted. This prevents the pay information received by the receiving portion RS1 from being recorded to be unlimitedly used, and allow charging in response to a degree of use when the receiving station RS1 repeatedly uses the recorded pay information.

Further, the information recording portion 64 records the pay information received by the receiving portion for X 61x as in a state of being scrambled, and the decrypting portion for X 62x descrambles the pay information when the recorded pay information is transmitted to the terminal 3. This can prevent the pay information recorded by the receiving station RS1 from being read out for use without authority.

(3) Used at the External terminal 9

Figure 14:
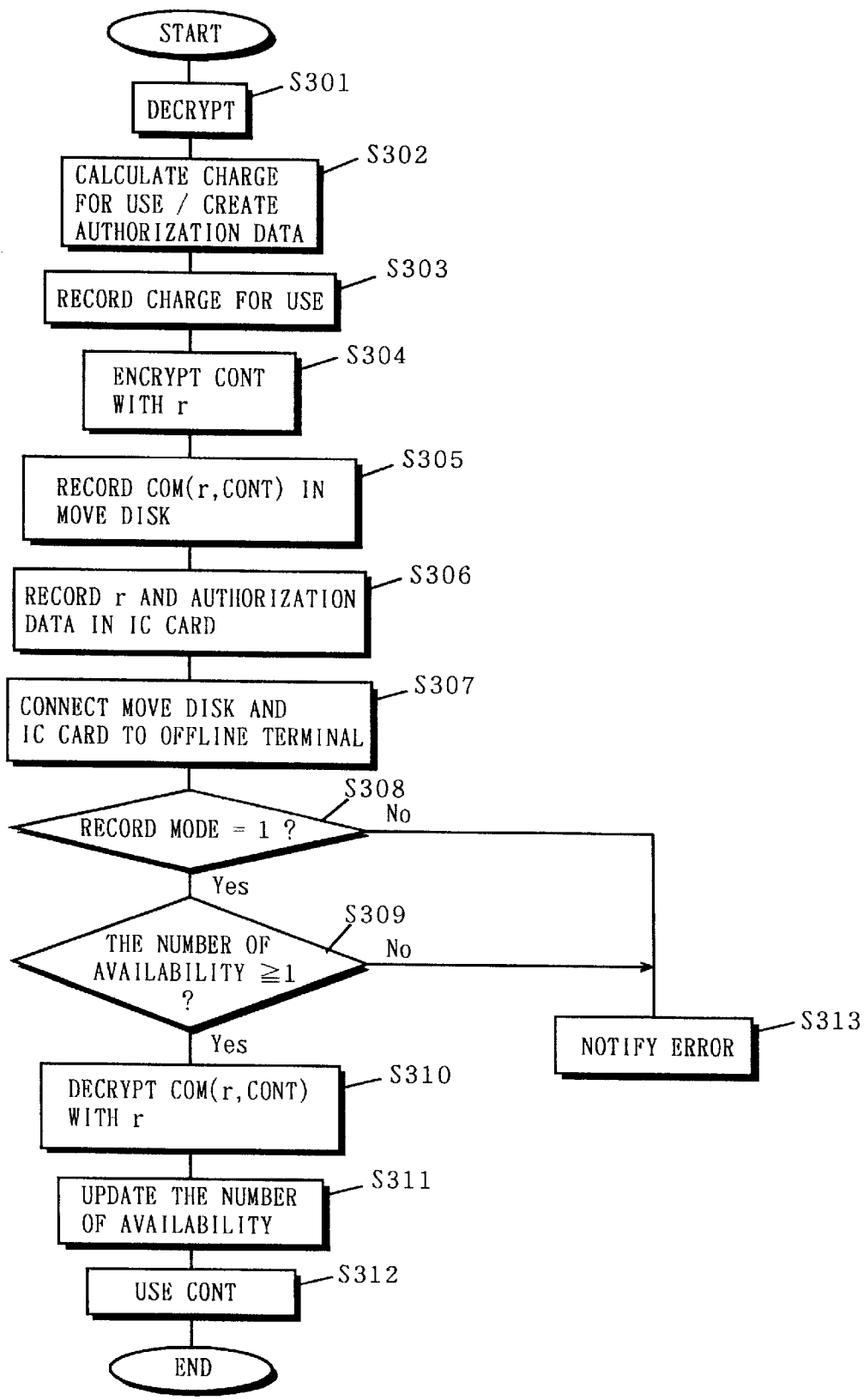
FIG. 14 is a flow chart showing operation of the system in FIG. 11 when pay information provided by the transmitting station TSx is received by the receiving station RS1 and used by an external terminal 9.

FIG. 14 is a flow chart showing operation of the system in FIG. 11 when pay information provided by the transmitting station TSx is received by the receiving station RS1 and used by the external terminal 9. Operation will be described below when the receiving station RS1 in FIG. 11 receives information provided from the transmitting station TSx and the user of the receiving station RS1 uses the information at the external terminal 9. Assume that the information provided from the transmitting station TSx is recorded in the information recording portion 64, as in step S201 to step S203 in FIG. 13.

First, the user of the receiving station RS1 inputs an intention of using certain pay information recorded in the information recording portion 64 to the terminal 3. In response, the terminal 3 creates a request including the intention and notifies the server 2. The server 2 which received the request retrieves the information which the user desires among the pay information recorded in the information recording portion 64 by referring to an information identifier added to each pay information. Then, the server 2 recognizes that the retrieved pay information is provided from the transmitting station TSx and inputs the pay information to the decrypting portion for X 62x. The decrypting portion for X 62x descrambles the inputted information (step S301).

Next, the accounting portion for X 63x creates authorization data. In the authorization data, the number of times for availability, a record mode and an accounting mode are included. In this case, the number of times for availability is the number of times the pay information is used, which the user reports, the record mode is set to 1 indicative of the pay information to be used at the external terminal 9, and the accounting mode is set to 1 indicating that the receiving station RS1 has been charged. At the same time, the accounting portion for X 63x calculates a charge for use in response to the above created authorization based on the accounting reference data added to the pay information descrambled by the decrypting portion for X 62x (that is, a charge for use in a case that the pay information is used the number of times equal to the number of times for availability included in the authorization) (step S302). The data recording portion 66 then records the charge for use calculated by the accounting portion for X 63x (step S303).

The pay information descrambled by the decrypting portion for X 62x, as in the case of using in real time in the above (1), is rescrambled and then recorded in the move disk 7 (step S304, step S305). The random number r generated by the random number generating portion 67 is recorded in the IC card 8 together with the authorization data created by the accounting portion for X 62x (step S306).

Next, the user carrying the move disk 7 in which the rescrambled pay information is recorded and the IC card 8 in which the random number r and the authorization data are recorded goes to a place where the external terminal 9 is installed, and connects the move disk 7 and the IC card 8 to the external terminal 9 (step S307). The internal descrambler 91 of the external terminal 9 first determines whether the record mode included in the authorization data recorded in the IC card 8 is 1 or not (step S308).

When the record mode is 1, the internal descrambler 91 further determines whether the number of times for availability is 1 or more or not (step S309). When the number of times for availability is 1 or more, the internal descrambler 91 descrambles the pay information recorded in the move disk 7 using the random number r recorded in the IC card 8, as in the case of using in real time in the above (1) (step S310). The external terminal 9 then updates the number of times for availability recorded in the IC card 8 (step S311), and next displays the pay information descrambled by the internal descrambler 91. In this way, the user can use the pay information at the external terminal 9 (step S312).

When the record mode is not 1 at step S308 or when the number of times for availability is 0 at step S309, the internal descrambler 91 does not perform descrambling of the rescrambled pay information using the random number r. In this case, the external terminal 9 notifies the user of an error (step S313).

In this manner, the accounting portion for X 63x creates authorization data for restricting the number of times for availability of the pay information and the number of available terminals, and simultaneously calculates a charge for use in response to the created authorization data based on the accounting reference data added to the pay information. When the pay information and the authorization data created by the accounting portion for X 63x are transmitted to the external terminal 9, the external terminal 9 displays the transmitted pay information to the user when prescribed conditions defined by the transmitted authorization data are satisfied. This allows charging in response to a degree of use when the user of the receiving station RS1 uses the pay information at the external terminal 9.

Further, the internal scrambler 65 rescrambles the pay information descrambled by the decrypting portion for X 62x using the random number generated by the random number generating portion 67. When the rescrambled pay information, the generated random number and the created authorization data are transmitted to the external terminal 9, the internal descrambler 91 descrambles the re-encrypted information with the random number only when the authorization data satisfies prescribed conditions. This can prevent the pay information from being used unlimitedly at the external terminal 9.

The internal scrambler 65 may rescramble the pay information descrambled by the decrypting portion for X 61x with the secret key for each terminal 3 stored in the data recording portion 66, and the internal descrambler 37 may descramble the rescrambled pay information with its own secret key. However, also in this case, it is required to use the pay information only when the authorization data satisfies the prescribed conditions.

Further, the pay information rescrambled by the internal scrambler 65, and the random number generated by the random number generating portion 67 and the authorization data created by the accounting portion for X 63x are transmitted to the external terminal 9 through a hand-held readable/writable storage medium such as the move disk 7 and through a hand-held storage medium in which the record contents are hard to analyze/change such as the IC card 8, respectively, thereby allowing the pay information to be safely transmitted from the server 2 to the external terminal 9.

(4) Received by the Receiving Station RS1 and Used by the Receiving Station RS2

Figure 15:
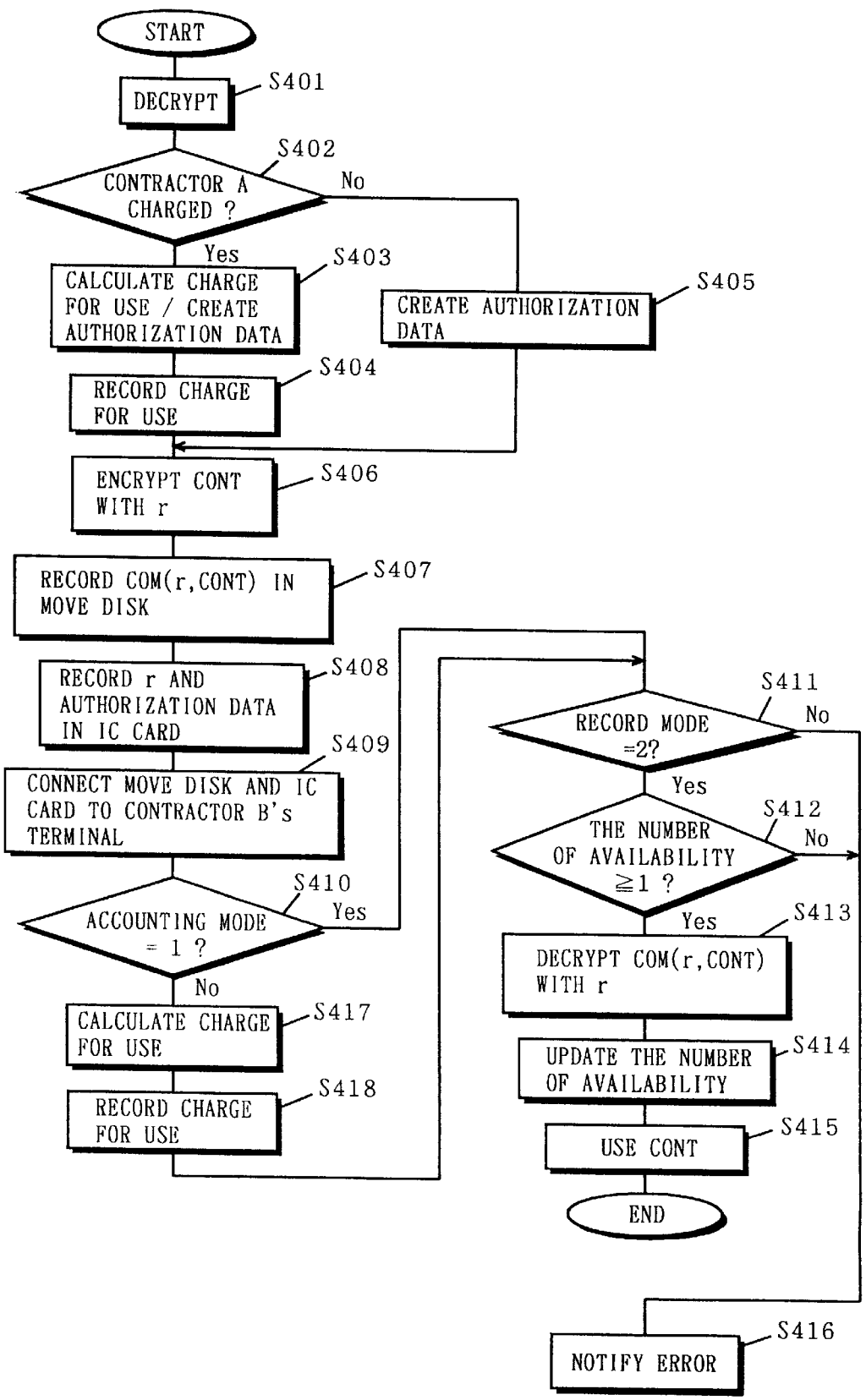
FIG. 15 is a flow chart showing operation of the system in FIG. 11 when pay information provided by the transmitting station TSx is received and re-provided for a receiving station RS2 by the receiving station RS1 and the receiving station RS2 uses the re-provided pay information.
Figure 16:
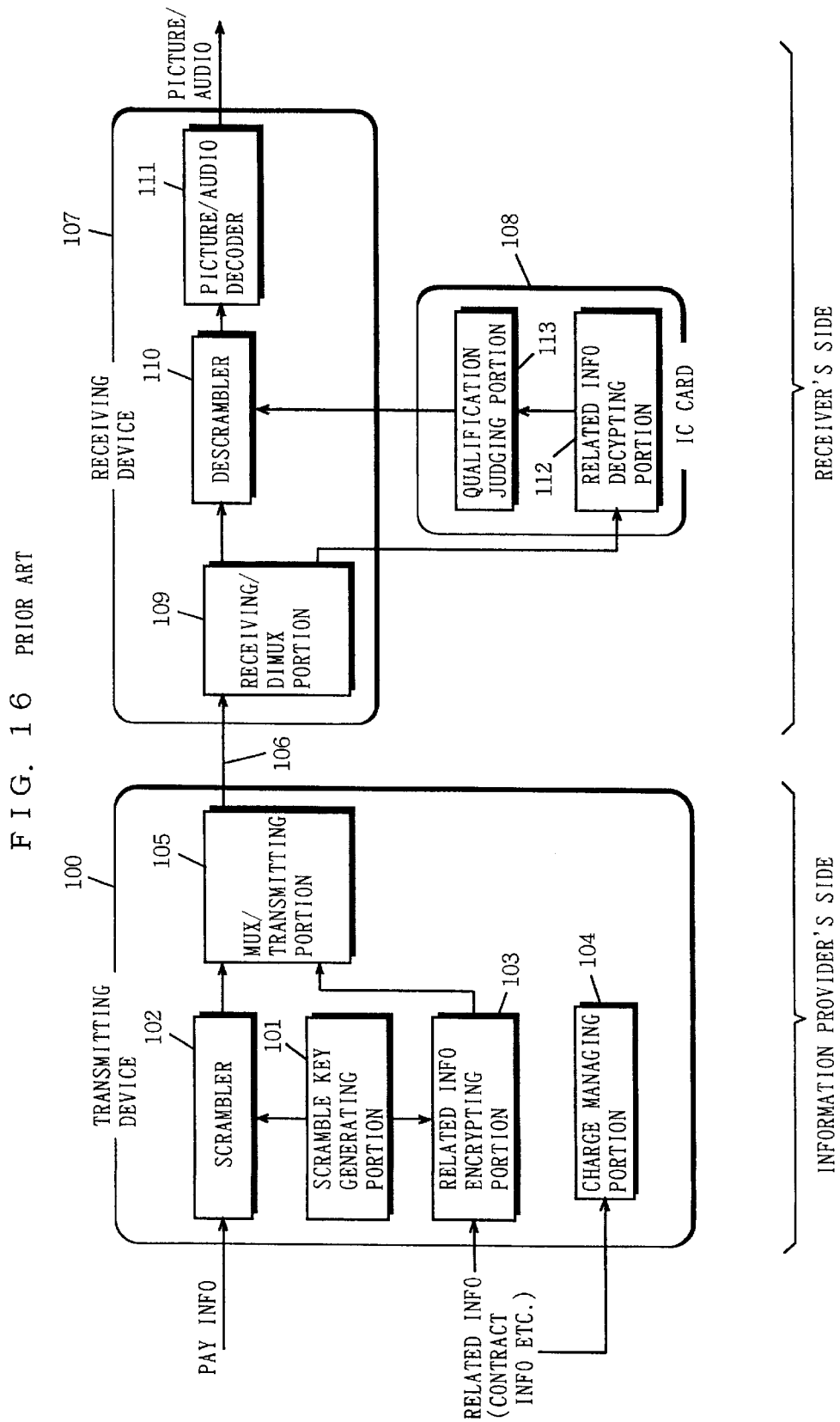
FIG. 16 is a block diagram showing the conventional pay broadcasting system using a broadcast satellite.

FIG. 15 is a flow chart showing operation of the system in FIG. 11 when pay information provided by the transmitting station TSx is received by the receiving station RS1 and re-provided for the receiving station RS2 and the receiving station RS2 uses the re-provided pay information. Referring to FIG. 15, operation will be described below when pay information provided by the transmitting station TSx is received by the receiving station RS1 and re-provided for the receiving station RS2 and the user of the receiving station RS2 uses the re-provided pay information. Assume that the pay information provided from the transmitting station TSx is recorded in the information recording portion 64 as in step S201 to step S203 in FIG. 13.

First, the user of the receiving station RS1 inputs to the terminal 3 an intention of re-providing certain pay information recorded in the information recording portion 64 for the receiving station RS2 and an intention of whether charging is made to the receiving station RS1 or the receiving station RS2 when the re-provided pay information is used in the receiving station RS2. In response, the terminal 3 creates a request including these intentions and notifies the server 2.

On receiving the request from the terminal 3, the server 2 retrieves the information which the user desires among the pay information recorded in the information recording portion 64 by referring to an information identifier added to each pay information. Then, the server 2 recognizes that the retrieved pay information is provided from the transmitting station TSx and inputs the pay information to the decrypting portion for X 62x. The decrypting portion for X 62x descrambleds the inputted pay information (step S401). Next, the accounting portion for X 63x determines whether to charge the receiving station RS1 based on the notification from the terminal 3 (step S402).

When the receiving station RS1 is charged, the accounting portion for X 63x, as in the case of using the external terminal 9 described in the above (3), creates authorization data, and calculates a charge for use in response to the created authorization data (step S403). The data recording portion 66 then records the charge for use calculated by the accounting portion for X 63x (step S404). However, in this case, the number of times for availability included in the created authorization data is the number of times the pay information is used at the receiving station RS2 which the user RS1 reports, the record mode is set to 2 indicative of the pay information to be used at the terminal 3 of the receiving station RS2, and the accounting mode is set to 1 indicating that the receiving station RS1 has been charged. Further, the calculated charge for use is a charge in a case that the user of the receiving station RS2 uses at the terminal 3 the pay information the number of times equal to the number of times for availability.

When the receiving station RS2 is charged, the accounting portion for X 63x does not calculate a charge for use but creates authorization data only (step S405). However, in this case, the number of times for availability included in the created authorization has a predetermined sufficiently large value, the record mode is set to 2 indicative of the pay information to be used at the terminal 3 of the receiving station RS2, and the accounting mode is set to 2 indicating no charging has been made.

Next, the internal scrambler 65, as in the case of using in real time described in the above (1), rescrambles the pay information descrambled by the decrypting portion for X 62x using the random number r generated by the random number generating portion 67 (step S406). The server 2 then records the pay information rescrambled by the internal scrambler 65 in the move disk 7 (step S407), and records the random number r generated by the random number generating portion 67 and the authorization data created by the accounting portion for X 63x in the IC card 8 (step S408).

On acquiring the move disk 7 in which the rescrambled pay information is recorded and the IC card 8 in which the authorization data is recorded, the user of the receiving station RS2 connects the acquired move disk 7 and IC card to the terminal 3 in the receiving station RS2 (step S409), and next inputs an intention of using the information recorded in the move disk 7. In the following, description goes on to operation of the receiving station RS2.

At the receiving station RS2, the internal descrambler 37 of the terminal 3 to which the above intention is inputted first determines whether the accounting mode included in the authorization data recorded in the IC card 8 is 1 or not, that is, whether the receiving station RS1 has been charged or not (step S410). When the accounting mode is 1, the internal descrambler 37 further determines whether the record mode included in the authorization data is 2 or not, that is, whether the information is to be used at the terminal 3 of the receiving station RS2 (step S411). When the record mode is 2, the internal descrambler 37 further determines whether the number of times for availability included in the authorization data is 1 or more, or not (step S412).

When the number of times for availability is 1 or more, the internal descrambler 37 descrambles the rescrambled pay information recorded in the move disk 7 using the random number r recorded in the IC card 8, as in the case of using in real time in (1) (step S413). Next, the terminal 3 updates the number of times for availability included in the authorization data (step S414) and displays the pay information decrypted by the internal descrambler 37. In this way, the user of the receiving station RS2 can use the pay information re-provided from the receiving station RS1 (step S415).

When the record mode is not 2 at step S411, or when the number of times for availability is 0 at step S412, the internal descrambler 37 does not perform operation of descrambling the re-encrypted pay information with the random number r. In this case, the terminal 3 notifies the user of an intention that the pay information cannot be used (step S416).

When the accounting mode is not 1 at step S410, that is, when no charging has been made, the terminal 3 notifies the server 2 of the accounting reference data added to the rescrambled pay information recorded in the move disk 7. The accounting portion for X 63x of the server 2 calculates a charge for use of the pay information based on the notified accounting reference data (step S417), and the data recording portion 66 records the charge for use calculated by the accounting portion for X 63x (step S418). The flow goes on to the operation at step S411.

In this way, when the receiving station RS1 is charged, the accounting portion for X 63x in the receiving station RS1 creates the authorization data for defining the number of times for use and the number of available terminals for the pay information, and also calculates a charge for use in response to the created authorization data based on the accounting reference data added to the pay information. When the pay information and the created authorization data are transmitted to the receiving station RS2, the terminal 3 in the receiving station RS2 displays the transmitted pay information only when the transmitted authorization data satisfies prescribed conditions. This allows to charge the receiving station RS1 side in response to a degree of use when the pay in formation received by the receiving station RS1 is used at the receiving station RS2.

A providing form that the pay in formation received by the receiving station RS1 is used at the receiving station RS2 and the receiving station RS1 is charged is a completely new information providing form never existed before.

When the receiving station RS2 is charged, the accounting portion for X 63x in the receiving station RS1 creates authorization data for restricting available terminals for the pay information. When the pay information and the created authorization data are transmitted to the receiving station RS2, the accounting portion for X 63x of the server 2 in the receiving station RS2 calculates a charge for use of the pay information based on the accounting reference data added to the transmitted pay information. On the other hand, the terminal 3 in the receiving station RS2 displays the transmitted pay information only when the transmitted authorization data satisfies prescribed conditions. This allows to charge the receiving station RS2 side in response to a degree of use when the pay information received by the receiving station RS1 is used at the receiving station RS2.

While described above is the case where information and data etc., are transmitted from the receiving station RS1 to the receiving station RS2 through the move disk 7 and the IC card 8, respectively, described below is a case where information and data etc., are transmitted through a CATV network using FIG. 11 and FIG. 15.

Operation of the present system is different from the operation shown in FIG. 15 in the following points. That is, the receiving station RS1 and the receiving station RS2 respectively hold a shared key KAB. At steps S406 to S408, the internal scrambler 65 in the receiving station RS1 rescrambles the pay information descrambled by the decrypting portion for X 62x using the random number r generated by the random number generating portion 67, and further encrypts the random number r and the authorization data created by the accounting portion for X 63x with the shared key KAB. The server 2 in the receiving station RS1 then transmits the pay information rescrambled by the internal scrambler 65 and the encrypted random number and authorization data through the CATV network to the receiving station RS2.

Further, at step S409, when the terminal 3 in the receiving station RS2 receives the rescrambled pay information and the encrypted random number and authorization data transmitted through the CATV network, the internal descrambler 37 decrypts the encrypted random number and authorization data using the shared key KAB.

In this way, when pay information, a random number and authorization data are transmitted through a transmission path in which a transmission rate is relatively large such as a CATV network, the pay information is rescrambled using a random number, and the random number and the authorization data are encrypted using the shared key KAB, thereby allowing the pay information to be safely transmitted from the receiving station RS1 to the receiving station RS2.

Instead of encrypting the random number and the authorization data using the shared key KAB, encrypting can be made in a so-called public encryption method. Further, instead of the CATV network, through B-ISDN, the rescrambled pay information and the encrypted random number and authorization data may be transmitted from the receiving station RS1 to the receiving station RS2.

Next, description is now made in a case of transmitting information and data through the move disk 7 and a transmission line, respectively, referring to FIG. 11 and FIG. 15.

Operation of the present system is different from the operation shown in FIG. 15 in the following points. That is, the receiving station RS1 and the receiving station RS2 respectively hold a shared key KAB. At steps S406 to S408, the internal scrambler 65 in the receiving station RS1 re-encrypts the pay information descrambled by the decrypting portion for X 62x using the random number r generated by the random number generating portion 67, and further encrypts the random number r and the authorization data created by the accounting portion for X 63x with the shared key KAB. The server 2 in the receiving station RS1 then records the pay information rescrambled by the internal scrambler 65 in the move disk 7, and transmits the random number and authorization data encrypted by the internal scrambler 65 through a communication line to the receiving station RS2.

Further, at step S409, on acquiring the move disk 7 in which the rescrambled pay information is recorded, the user of the receiving station RS2 connects the acquired move disk 7 to the terminal 3 in the receiving station RS2. Further, when the terminal 3 receives the encrypted random number and authorization data transmitted through the transmission line, the internal descrambler 37 in the receiving station RS2 decrypts the encrypted random number and authorization data using the shared key KAB.

In this way, when a random number and authorization data are transmitted through a transmission line in which a transmission rate is relatively small such as a transmission line and pay information is recorded in the move disk 7 to be moved, the pay information is rescrambled with the random number and further the random number and the authorization data are encrypted with the shared key KAB, thereby allowing the pay information to be safely transmitted from the receiving station RS1 to the receiving station RS2. Instead of encrypting the random number and the authorization data with the shared key KAB, encryption can be made with a public encrypting method.

In the present embodiment, the number of times for availability is included in the authorization data, a deadline for availability may be included.

Further, in the present embodiment, when the user uses information at the external terminal 9, the accounting portion for X 63x creates authorization data and at the same time calculates a charge for use in response to the created authorization, while the number of times for use at the external terminal 9 may be recorded in the IC card 8, the user may connect the IC card 8 to the server 2 after use and at that time the accounting portion for X 63x may calculate a charge for use.

Further, in the present embodiment, charging is made in receiving station units, while charging can be made in user units by recording a charge for use for each terminal.

Further, a password may be issued to the user and authentication may be performed when the user uses the terminal, thereby further increasing security against unauthorized use.

While the invention has been described in detail, the foregoing description is in all aspects illustrative and not restrictive. It is understood that numerous other modifications and variations can be devised without departing from the scope of the invention.

What is claimed is:

1. A server for receiving information transmitted from a plurality of transmitting stations and distributing the information to one or more terminals, wherein the information transmitted from each of the transmitting stations is scrambled, said server comprising:
  a plurality of receiving portions operable to respectively receive the information transmitted from each of the transmitting stations,
  a plurality of descrambling portions operable to respectively descramble the information received by each of said receiving portions,
  one rescrambling portion operable to rescramble all of said descrambled information with a single scrambling method, and
  a distributing portion operable to distribute said rescrambled information into each of the terminals, wherein the information transmitted from each of the transmitting stations is scrambled with a different scrambling method, respectively, and each of said descrambling portions is operable to descramble the information received by each of said receiving portions by descrambling methods corresponding to each of the scrambling methods, respectively.

2. The server according to the claim 1, wherein a scramble key unique to each of the terminals is set in said rescrambling portion, and each of said descrambling portions is operable to rescramble said descrambled information by the scramble key unique to each of the terminals.

3. The server according to the claim 1, further comprising a random number generating portion operable to generate a random number, wherein:

said rescrambling portion is operable to rescramble said descrambled information by a random number generated by said random number generating portion, and to encrypt the random number by an encryption key unique to each of the terminals; and said distributing portion is further operable to distribute said encrypted random number of each of the terminals.

4. A receiving station for receiving information transmitted from a plurality of transmitting stations, wherein the information transmitted from each of the transmitting stations is scrambled, said receiving station comprising:
  one server, and
  one or more terminals, and said server comprising:
  a plurality of receiving portions operable to respectively receive the information transmitted from each of the transmitting stations,
  a plurality of descrambling portions operable to respectively descramble the information received by each of said receiving portions,
  one rescrambling portion operable to rescramble all of said descrambled information with a single scrambling method, and
  a distributing portion operable to distribute said rescrambled information to each of said terminals, and each of said terminals comprises a redescrambling portion operable to redescramble the rescrambled information, wherein the information transmitted from each of the transmitting stations is scrambled with a different scrambling method, respectively, and each of said descrambling portions is operable to descramble the information received by each of said receiving portions by descrambling methods corresponding to each of the scrambling methods, respectively.

5. The receiving station according to the claim 4, wherein a scramble key unique to each of said terminals is set in said rescrambling portion, said rescrambling portion is operable to rescramble said descrambled information by the scramble key unique to each of said terminals, a redescramble key unique to each of said terminals is set in each of said terminals to redescramble the rescrambled information by the scramble key unique to each of said terminals, and said receiving station further comprises a redescrambling portion included in each of said terminals operable to redescramble said rescrambled information by the redescramble key unique to said each terminal.

6. The receiving station according to the claim 4, further comprising a random number generating portion operable to generate a random number, wherein said rescrambling portion is operable to rescramble said descrambled information by a random number generated by said random number generating portion, and to encrypt the random number by an encryption key unique to each of said terminals, said distributing portion is further operable to distribute said encrypted random number to each of said terminals, a decryption key unique to each of said terminals is set to each of said terminals to decrypt the random number encrypted by the encryption key unique to each of said terminals, and said receiving station further comprises a redescrambling portion included in each of said terminals operable to decrypt the encrypted random number by the decryption key unique to said each terminal, and to redescramble said rescrambled information by said random number decrypted by said redescrambling portion.

* * * * *